(12) United States Patent
Montano et al.

(10) Patent No.: US 7,280,518 B2
(45) Date of Patent: Oct. 9, 2007

(54) METHOD OF OPERATING A MEDIA ACCESS CONTROLLER

(75) Inventors: Sergio T. Montano, Vienna, VA (US); William M. Shvodian, McLean, VA (US); Knut T. Odman, Vienna, VA (US); Russell G. Dowe, Vienna, VA (US); Joel Z. Apisdorf, Reston, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 1100 days.

(21) Appl. No.: 10/262,946

(22) Filed: Oct. 3, 2002

(65) Prior Publication Data

US 2003/0063619 A1    Apr. 3, 2003

Related U.S. Application Data

(60) Provisional application No. 60/326,425, filed on Oct. 3, 2001.

(51) Int. Cl.
*H04B 7/212* (2006.01)
(52) U.S. Cl. ............... 370/338; 370/443; 370/458; 370/462
(58) Field of Classification Search ............ 370/442, 370/443, 458, 462, 338
See application file for complete search history.

(56) References Cited

U.S. PATENT DOCUMENTS

| | | | |
|---|---|---|---|
| 5,815,811 A | 9/1998 | Pinard et al. | |
| 6,175,739 B1 | 1/2001 | Ishii et al. | |
| 6,272,117 B1 | 8/2001 | Choi et al. | |
| 6,795,407 B2 * | 9/2004 | Chesson | 370/311 |
| 6,970,422 B1 * | 11/2005 | Ho et al. | 370/230 |
| 7,068,633 B1 * | 6/2006 | Ho | 370/338 |
| 7,110,380 B2 * | 9/2006 | Shvodian | 370/336 |

OTHER PUBLICATIONS

First Office Action from Chinese Patent Office issued on Aug. 4, 2006 for the corresponding Chinese patent application No. 02822574.0 (a copy and English translation thereof).

* cited by examiner

*Primary Examiner*—Min Jung

(57) ABSTRACT

A method is provided for a remote device to monitor and communicate with a wireless network using cyclic beacons. The remote device receives a beacon, which beacon includes beacon information that defines a superframe. From the beacon information, the remote device determines whether the received beacon and the associated superframe are assigned to a network device or are unassigned. By receiving as many beacons as there are allowable devices in the network, the remote device can determine if the network is full. If the remote device runs through all of the beacons and all indicate that their associated superframes are assigned, then the remote device determines that the network is full and performs a network-full function. If the remote device receives a beacon that indicates that its associated superframe is unassigned, it determines that the network is not full and performs an association request during the unassigned superframe.

18 Claims, 16 Drawing Sheets

METHOD OF OPERATING A MEDIA ACCESS CONTROLLER

RELATED APPLICATION

This application benefits from the priority of a provisional application Ser. No. 60/326,425, filed Oct. 3, 2001, entitled "MiniMAC TDMA Protocol," the disclosure of which is incorporated by reference in its entirety.

BACKGROUND OF THE INVENTION

The present invention relates to wireless personal area networks and wireless local area networks. More particularly, the present invention relates to systems, methods, devices, and computer program products for controlling the transmission of data in a wireless personal area network or wireless local area network environment.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY Layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802.15 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of devices 321-325. The coordinator 310 serves to control the operation of the network 300. As noted above, the system of coordinator 310 and devices 321-325 may be called a piconet, in which case the coordinator 310 may be referred to as a piconet coordinator (PNC). Each of the non-coordinator devices 321-325 must be connected to the coordinator 310 via primary wireless links 330, and may also be connected to one or more other non-coordinator devices 321-325 via secondary wireless links 340, also called peer-to-peer links.

In addition, although FIG. 3 shows bi-directional links between devices, the could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 321-325, except with the additional functionality for coordinating the system, and the requirement that it communicate with every device 321-325 in the network 300. In other embodiments the coordinator 310 may be a separate designated control unit that does not function as one of the devices 321-325.

Through the course if the following disclosure the coordinator 310 will be considered to be a device just like the non-coordinator devices 321-325. However, alternate embodiments could use a dedicated coordinator 310. Furthermore, individual non-coordinator devices 321-325 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 321-325 are confined to a usable physical area 350, which is set based on the extent to which the coordinator 310 can successfully communicate with each of the non-coordinator devices 321-325. Any non-coordinator device 321-325 that is able to communicate with the coordinator 310 (and vice versa) is within the usable area 350 of the network 300. As noted, however, it is not necessary for every non-coordinator device 321-325 in the network 300 to communicate with every other non-coordinator device 321-325.

FIG. 4 is a block diagram of a device 310, 321-325 from the network 300 of FIG. 3. As shown in FIG. 4, each device (i.e., each coordinator 310 or non-coordinator device 321-325) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 205 include the functionality of the device 310, 321-325. These upper layers 430 may include TCP/IP, TCP, UDP, RTP, IP, LLC, or the like.

Typically, the coordinator 310 and the non-coordinator devices 321-325 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using time division multiple access (TDMA). Using this standard, the MAC layer 420 defines frames and superframes through which the sharing of the bandwidth by the devices 310, 321-325 is managed by the coordinator 310 and/or the non-coordinator devices 321-325.

Of particular interest is how individual devices 321-325 can join an existing network 300, and how they will communicate with the coordinator 310 during operation of the network 300. This is preferably done to avoid collisions between different devices, which may occur if two or more devices 321-325 try and communicate (with each other or the coordinator 310) at the same time.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

SUMMARY OF THE INVENTION

Consistent with the title of this section, only a brief description of selected features of the present invention is now presented. A more complete description of the present invention is the subject of this entire document.

An object of the present invention is to provide a device a method to join an existing wireless network without colliding with other device.

Another object of the present invention is to provide a way of accommodating communication between devices and a coordinator to avoid collisions.

Another feature of the present invention is to address the above-identified and other deficiencies of conventional communications systems and methods.

Some of these objects are accomplished by way of a method for a remote device to monitor and communicate with a wireless network, comprising: receiving a beacon at the remote device, the beacon including beacon information that defines a superframe; determining from the beacon information whether the received beacon and the associated superframe are assigned to a network device or are unassigned; repeating the steps of receiving and determining until the remote device either receives M assigned beacons or one unassigned superframe; performing an association request if the remote device receives an unassigned superframe; performing a network-full function if the remote device receives M assigned superframes, wherein M is an integer greater than one.

In this method, the beacon information may include superframe assignment information that indicates whether the superframe is assigned or unassigned. The superframe assignment information may comprise a single bit indicative of whether the superframe is assigned or unassigned, or the superframe assignment information includes device identification (ID) information. The device ID information is preferably a device ID of an associated network device if the superframe is assigned, and the device ID is preferably a set unassigned value that does not correspond to any network device but is indicative of an unassigned superframe if the superframe is unassigned.

The network-full function may include sending an error message to a higher layer.

A method is also provided for a remote device to monitor and communicate with a wireless network, comprising: receiving a beacon at the remote device, the beacon including beacon information that defines a superframe; determining from the beacon information whether the received beacon and the superframe are fully assigned to N network devices or are unassigned; repeating the steps of receiving and determining until the remote device either receives M fully assigned superframes or one unassigned superframe; performing an association request if the remote device receives an unassigned superframe; performing a network-full function if the remote device receives M fully assigned superframes, wherein M is an integer greater than one, and wherein N is an integer greater than one. The value of N can be constant or can vary for each superframe.

The beacon information may include superframe assignment information that indicates whether the superframe is fully assigned or unassigned.

The superframe assignment information may include first through $N^{th}$ device identification (ID) information. Each of the first through $N^{th}$ device ID information is preferably one of: a device ID of an associated network device, and a set unassigned value that does not correspond to any network device but is indicative of an unassigned superframe. The superframe is considered to be fully assigned if all of the first through $N^{th}$ device information are device IDs, and the superframe is considered to be unassigned if any of the first through $N^{th}$ device information are the set unassigned value.

The network-full function may include sending an error message to a higher layer.

In addition, a method is provided for a coordinator to communicate information in a wireless network that employs a superframe structure, This method comprises: generating M beacons, each including beacon information that defines one of M respective superframes; and sequentially transmitting the M beacons during the M respective superframes. The beacon information includes data indicative of whether the beacon is assigned to a device in the network or unassigned. M is preferably an integer greater than one.

The steps of generating M beacons and sequentially transmitting the M beacons are preferably continually repeated throughout operation of the network.

M may be equal to the maximum number of devices allowable in the network, or M may be equal to the number of assigned devices in the network plus a set value. The set value may be one.

Another method is provided for a coordinator to communicate information in a wireless network that employs a superframe structure. This method comprises: generating M beacons, each including beacon information that defines one of M respective superframes; and sequentially transmitting the M beacons during the M respective superframes. The beacon information includes data indicative of whether the beacon is assigned to N devices in the network or is unassigned. M is preferably an integer greater than one, and N is preferably an integer greater than one.

The steps of generating M beacons and sequentially transmitting the M beacons are preferably continually repeated throughout operation of the network.

The quantity (M×N) may be equal to the maximum number of devices allowable in the network.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings. In these drawings like reference numerals designate identical or corresponding parts throughout the several views.

DETAILED DESCRIPTION OF THE PREFERRED EMBODIMENTS

Figure 1:
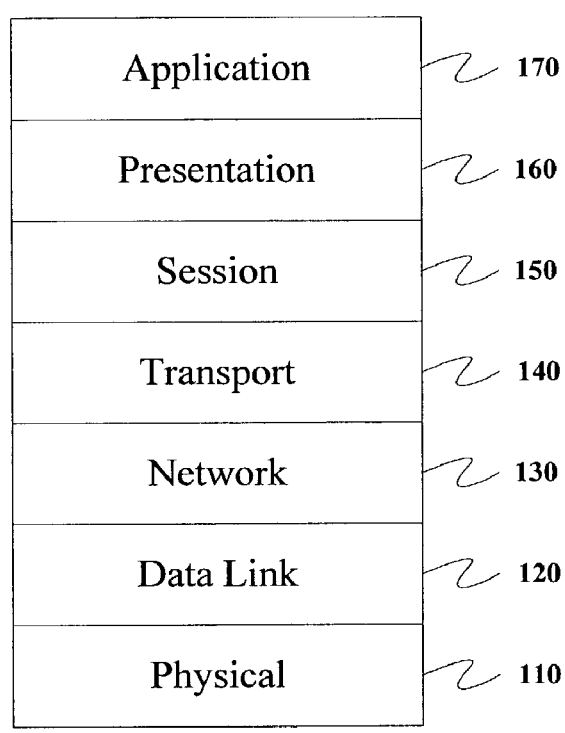
FIG. 1 is a block diagram of the OSI standard for a computer communication architecture.
Figure 2:
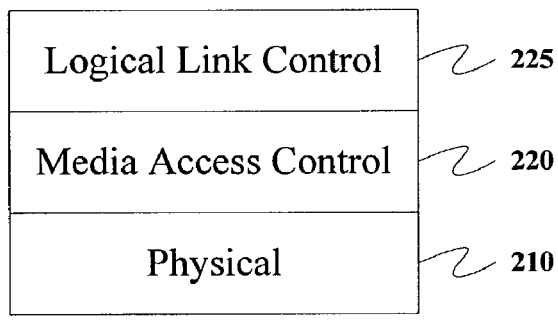
FIG. 2 is a block diagram of the IEEE 802 standard for a computer communication architecture.
Figure 3:
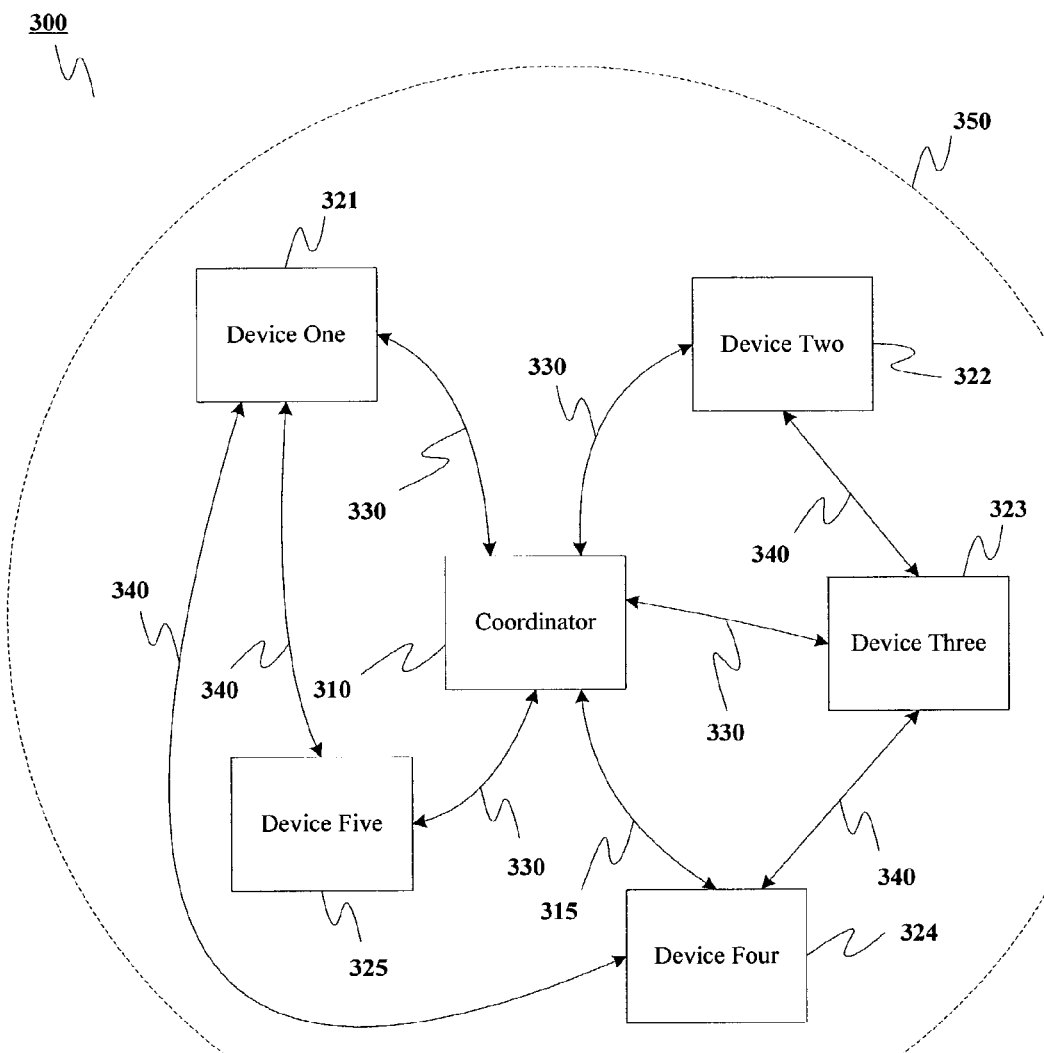
FIG. 3 is a block diagram of a wireless network.
Figure 4:
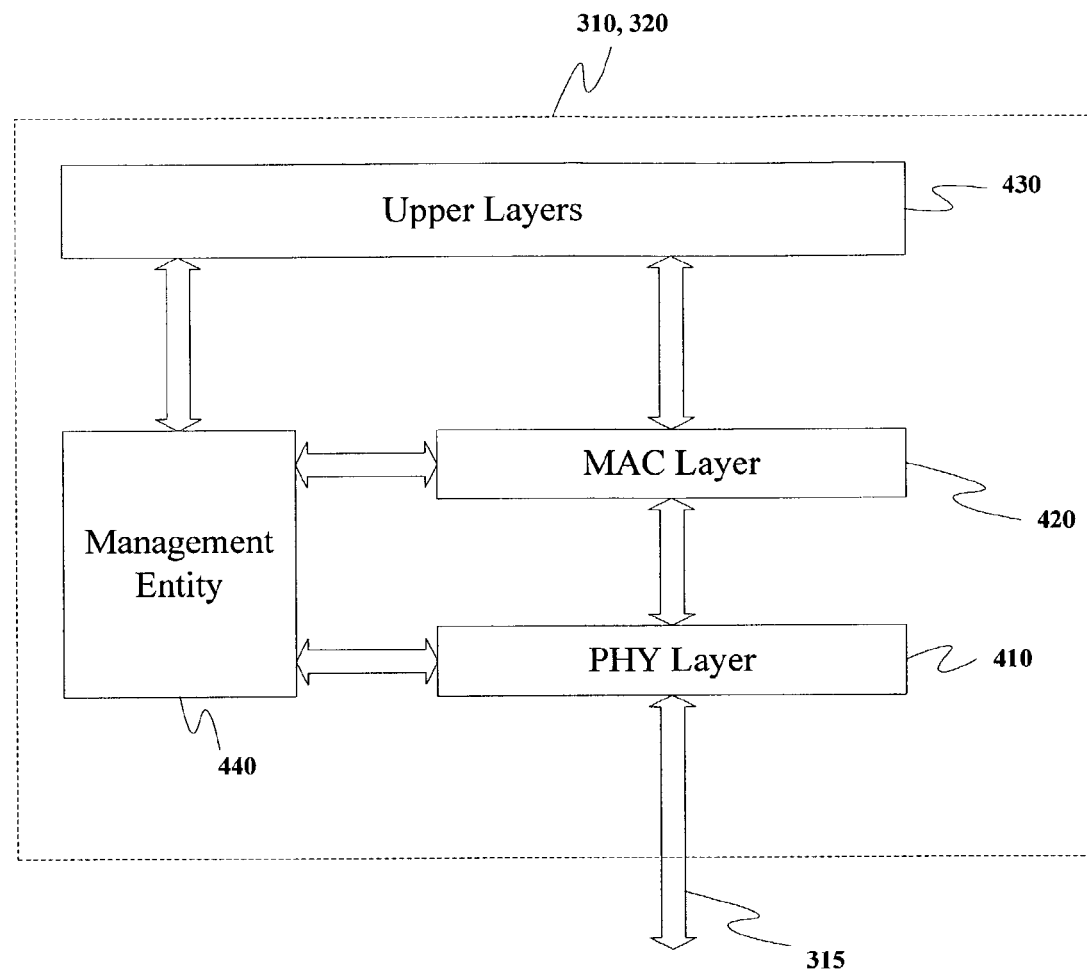
FIG. 4 is a block diagram of a device or coordinator in the wireless network of FIG. 3.

The present invention provides a method of coordinating devices 310, 321-325 either operating in a network 300 or trying to join a network 300 through the use of cyclic beacons inside superframes that define the data path across the network 300.

Device IDs and MAC Addresses

One important aspect of coordinating devices 310, 321-325 in a network 300 is uniquely identifying each of the devices 310, 321-325. There are several ways in which this can be accomplished.

Independent of any network it is in, each device 310, 321-325 has a unique MAC address that can be used to identify it. This MAC address is generally assigned by the manufacturer so that no two devices 310, 321-325 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 321-325 in the network 300 to use in addition its unique MAC address. In the preferred embodiments the MAC 420 uses ad hoc device IDs to identify devices 310, 321-325. These device IDs can be used, for example, in the MAC header. The device IDs are generally much smaller than the MAC addresses for each device 310, 321-325. In the preferred embodiments the device IDs are 4-bits and the MAC addresses are 48-bits.

Each device 310, 321-325 should maintain mapping table that maps the correspondence between device IDs and MAC addresses. The table is filled in based on the device ID and MAC address information provided to the devices 321-325 by the coordinator 310. This allows each device 310, 321-325 to reference themselves and the other devices in the network 300 by either device ID or MAC address.

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.ieee802.org/15/pub/TG3.html. Nothing in this disclosure should be considered to be incompatible with the draft 802.15.3 standard, as set forth on the IEEE 802 LAN/MAN Standards Committee web page.

Superframes

The available bandwidth in a given network 300 is split up in time by the coordinator 310 into a series of repeated superframes. These superframes define how the available transmission time is split up among various tasks. Individual frames of data are then transferred within these superframes in accordance with the timing set forth in the superframe.

Figure 5:
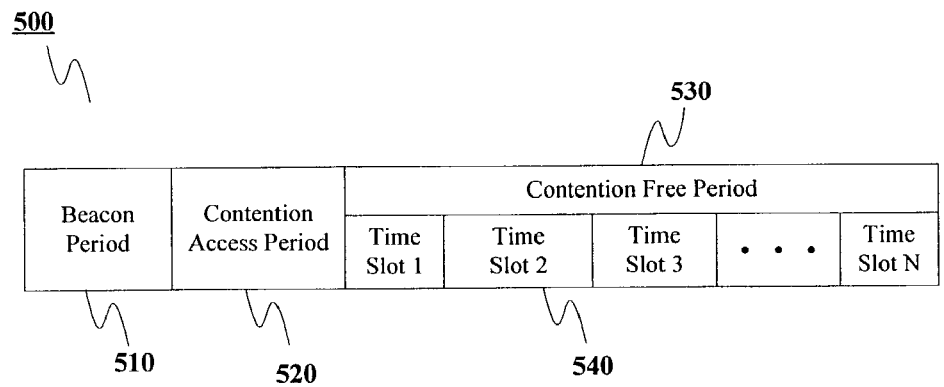
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame (see, e.g., FIGS. 6 and 8H) out to the non-coordinator devices 321-325 in the network 300. Each device 321-325 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to pairs of devices 310, 321-325 for transmission of information between them (i.e., each time slot 540 is assigned to a specific transmitter-receiver pair).

The time slots 540 may be management time slots (MTSs) or guaranteed time slots (GTSs). An MTS is a time slot that is used for transmitting administrative information between the coordinator 310 and one of the non-coordinator devices 321-325. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device.

A GTS is a time slot that is used for transmitting non-administrative data between devices 310, 321-325 in the network 300. This can include data transmitted between two non-coordinator devices 321-325, or non-administrative data transmitted between the coordinator 310 and a non-coordinator device 321-325.

As used in this application, a stream is a communication between a source device and one or more destination devices. The source and destination devices can be any devices 310, 321-325 in the network 300. For streams to multiple destinations, the destination devices can be all or some of the devices 310, 321-325 in the network 300.

In some embodiments the uplink MTS may be positioned at the front of the CFP 530 and the downlink MTSs positioned at the end of the CFP 530 to give the coordinator 310 a chance to respond to an uplink MTS in the in the downlink MTS of the same superframe 500. However, it is not required that the coordinator 310 respond to a request in the same superframe 500. The coordinator 310 may instead respond in another downlink MTS assigned to that non-coordinator device 321-325 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 321-325 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a device 321-325 successfully receives a beacon frame from the coordinator 310.

For simplicity, a single guard time value may be used for the entire superframe. The guard time will preferably be placed at the end of each beacon frame, GTS, and MTS.

Frames

Within each superframe 500, information is passed between devices 310, 321-325 through frames, which define how signals will be sent. In particular, a frame defines how the bits that make up the signal are organized so that they will be sent in a recognizable format.

Figure 6:
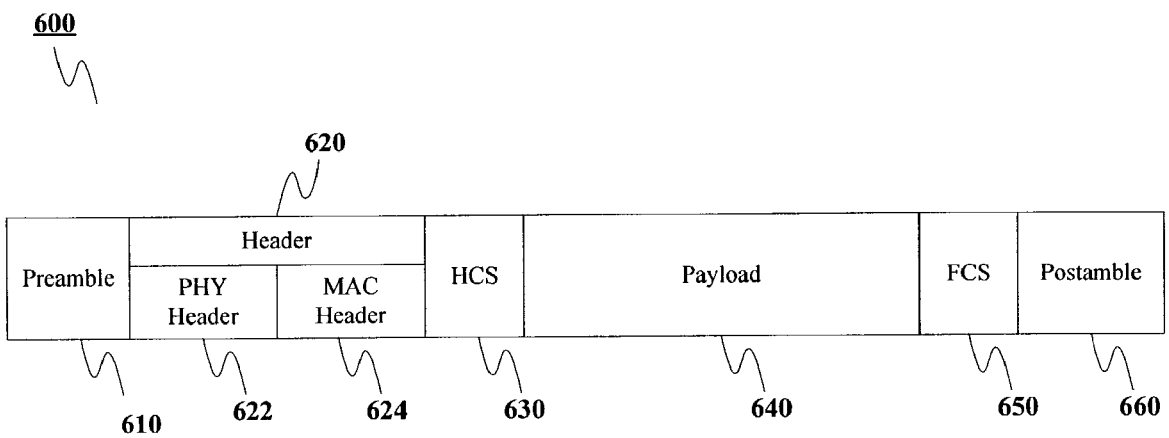
FIG. 6 is a block diagram of a frame according to a preferred embodiment of the present invention.

FIG. 6 is a block diagram of a frame according to preferred embodiments of the present invention. As shown in FIG. 6, the frame 600 may include a preamble 610, a header 620, a header check sequence (HCS) 630, a payload 640, a frame check sequence (FCS) 450, and a postamble 660. The header 620 is preferably divided into a physical header 622 and a MAC header 624. These elements will be discussed in more detail below.

Preamble

The preamble 610 is a set bit pattern that is used to synchronize the transmission timing between two communicating devices 310, 321-325. It ensures that the receiver correctly interprets when the data transmission starts by giving it a uniform, known starting point. In addition, the preamble 610 may include a start frame delimiter (SFD) that is used to synchronize the clocks in the various devices 310, 321-325.

Headers

As noted above, the header 620 is divided into a physical header 622 and a MAC header 624. The physical header 622 provides information about the physical signal sent between devices 310, 321-325, and it preferably includes at least the length of the current payload 640. It may also include information relating to the data rate at which the payload 640 is sent, or other information.

Figure 7A:
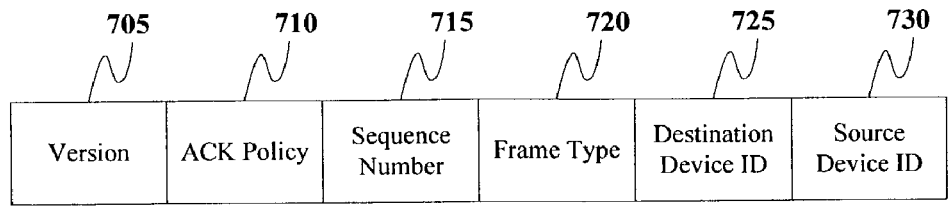
FIGS. 7A and 7B are block diagrams showing the MAC header of FIG. 6 according to preferred embodiments of the present invention.
Figure 7B:
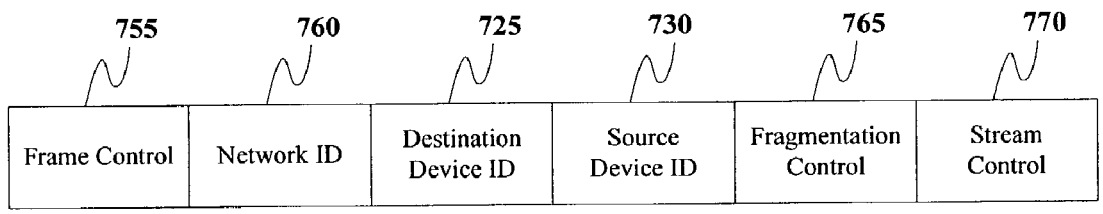

The MAC header 624 preferably includes data relating to the transfer of frames between devices 310, 321-325. FIGS. 7A and 7B are block diagrams showing the MAC header of FIG. 6 according to preferred embodiments of the present invention. FIG. 7A is a block diagram showing the MAC header according to a first preferred embodiment, and FIG. 7B is a block diagram showing the MAC header according to a second preferred embodiment.

As shown in FIG. 7A, the MAC header 624 includes a version indicator 705, an ACK policy indicator 710, a sequence number 715, a frame type 720, a destination device ID 725, and a source device ID 730.

The version indicator 705 indicates what version of the header 620 is used. In the preferred embodiment the version indicator 705 is a single bit. In alternate embodiments it could be larger.

The ACK policy indicator 710 is used to set when an acknowledgement (ACK) is required after the current frame 600 is sent. In this preferred embodiment, the ACK policy indicator 710 is a single bit that is set to a True value (e.g., "1") when an ACK is requested and to a False value (e.g., "0") when an ACK is not requested. In broadcast and multicast frames it should be set to the False value so that the receivers will not all generate an ACK frame. In addition, acknowledgement frames should have the ACK policy indicator 710 set to the False value since they are not acknowledged.

The sequence number 715 is used to track the transmission of data frames and account for duplicate frames. The sequence number 715 is cycled through F values, which are assigned to consecutive transmitted data frames. If a receiver receives two sequential frames with the same sequence number 715, it knows that it received a duplicate frame due to retransmission. The duplicate frame should be acknowledged, but discarded. In the preferred embodiment (F=3). For all other frames 600, the sequence number stays at zero.

The frame type 720 indicates what type of frame 600 is being sent. In this preferred embodiment the frame type 720 is 4 bits. Frame types 720 include: beacon, status request, association request, association reply, disassociation indication, ACK, data, stream allocation request, stream allocation reply, stream de-allocation, stream reallocation.

A beacon frame type indicates that the frame is a beacon 510, which is generated by the coordinator 310 at start of every superframe 500. A status request frame is sent by the coordinator 310 in an MTS to check on the status of the destination device. An association request frame is sent by a new device requesting that the coordinator 310 let it join the network 310. An association reply frame is sent by the coordinator 310 to a new device in response to an association request frame. A disassociation indication frame is sent by a current device 321-325 to the coordinator 310 to indicate disassociation from the network 300. An ACK frame indicates an immediate acknowledgement (ACK) of a previous frame. A data frame is sent between any two devices to pass isochronous data along a stream. A stream allocation request frame is sent by a current device 321-325 to the coordinator 310 to request that it be allocated a stream. A stream allocation reply frame is sent from the coordinator 310 to a current device 321-325 in response to a stream request frame. A stream de-allocation frame is sent from a current device 321-325 to the coordinator 310 to indicate that the current device 321-325 no longer needs a stream. A stream reallocation frame is sent from a device 321-325 to a coordinator 310 to request a change of an already-allocated stream.

The destination device ID 725 is the device ID of the device 310, 321-325 to which the frame 600 is being sent.

The source device ID 730 is the device ID of the device 310, 321-325 from which the frame 600 is being sent.

FIG. 7B shows a MAC header 624 according to a second preferred embodiment of the present invention. This embodiment conforms with the header format in the IEEE 802.15.3 standard. As shown in FIG. 7B, the MAC header 624 includes a frame control 755, a network ID 760, a destination device ID 725, a source device ID 730, a fragmentation control 765, and a stream control 770.

The frame control 755 provides information about version, frame type, acknowledgment policy, retry policy, etc. In the preferred embodiment the frame control 755 is 16 bits and is split up into multiple fields: a protocol version field indicates the version of the header format; a frame type field indicates the type of frame being sent; an SEC field indicates whether security protocols will be used; an ACK policy field indicates the acknowledgement policies that will be used for the frame; a delay ACK request field indicates whether a delayed acknowledgement should be made for the current frame; a retry field indicates whether the frame is a retransmission of a previous frame; and a more data field indicates whether the transmitting device has more data to transmit after the current frame in the same GTS.

The network ID 760 indicates an identifying number for the network 300. Preferably this number remains constant for the duration of a network 300, and may also be fixed for any network 300 created by a given coordinator 310.

The destination device ID 725 is the device ID of the device 310, 321-325 to which the frame 600 is being sent.

The source device ID 730 is the device ID of the device 310, 321-325 from which the frame 600 is being sent.

The fragmentation control 765 is used to assist with the fragmentation and reassembly of service data units (SDUs) in the network 300. It preferably contains information relating to the current service data unit, the current fragment number, and the previous fragment number.

The stream control 770 indicates a unique stream identifier for the stream used by the current frame 600.

In the first preferred embodiment, the header 620 is 32-bits. If fewer bits are needed for a given portion of the header 620, unused bits can be reserved. In other words, they may be accounted for in the header length and transmitted with each header, but not used by the receiving device. As a result, it is unimportant what the actual bits used are.

For example, in the first preferred embodiment (see FIGS. 6 and 7A), the following values are chosen. The physical header 622 and the MAC header 624 are both 16 bits. Within the physical header 622, the frame length is 15 bits, and 1 bit is reserved. Within the MAC header 624, the version indicator 705 is 1 bit, the ACK policy indicator 710 is 1 bit, the sequence number 715 is 2 bits, the frame type 720 is 4 bits, the destination address 725 is 4 bits, and the source address 730 is 4 bits.

Header Check Sequence (HCS)

The HCS 630 is a field that contains a cyclic redundancy check (CRC) used to confirm the header 620. In the first preferred embodiment the HCS is 16-bits, and it is preferably calculated using the following standard generator polynomial of degree 16 known as CRC-CCITT:

$$G(x)=x^{16}+x^{12}+x^5+1 \qquad (1)$$

The HCS 630 is the one's complement of the sum (modulo 2) of the following: (1) the remainder of $x^k x(x^{12}+x^{11}+x^{10}+x^8+x^3+x^2+x^1+1)$ divided (modulo 2) by G(x), where k is the number of bits in the calculation field; and (2) the remainder after the multiplication of the contents (treated as a polynomial) of the calculation field by $x^{32}$ and then division by G(x).

The HCS 630 is preferably transmitted commencing with the coefficient of the highest order term.

In a preferred embodiment the initial remainder of the division is preset to all ones at the transmitter and is then modified by division of the calculation fields by the generator polynomial G(x). The ones complement of this remainder is then transmitted, with the high order bit first, as the HCS 630.

At the receiver, the initial remainder is then preset to all ones and the serial incoming bits of the calculation fields and HCS 630, when divided by G(x) results in the absence of transmission errors, in a unique non-zero remainder value. The unique remainder value is the polynomial:

$$x^{12}+x^{11}+x^{10}+x^8+x^3+x^2+x+1 \qquad (2)$$

or 0xD0F

In the first preferred embodiment, the CRC in the HCS 630 is 16 bits. This may be increased or decreased as needed in alternate embodiments.

Payload

Figure 8A:
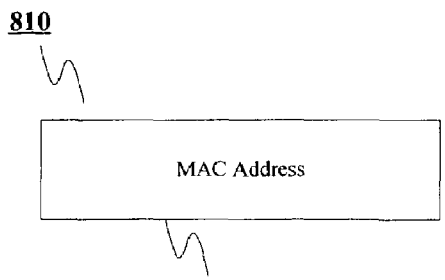
FIGS. 8A through 8H are block diagrams showing exemplary payloads from FIG. 6 according to a first preferred embodiment of the present invention.
Figure 8B:
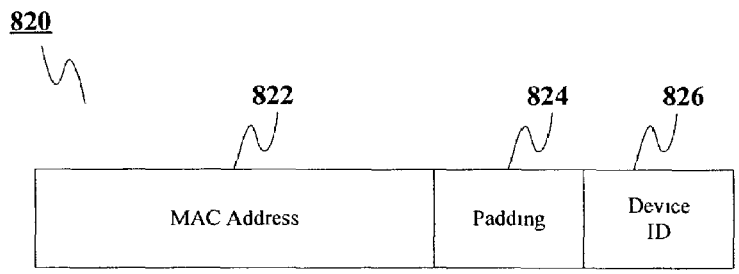
Figure 8C:
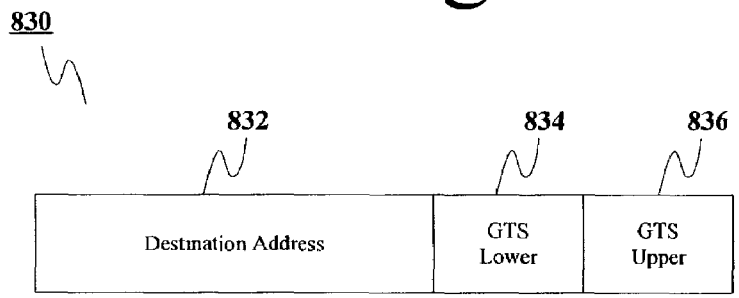
Figure 8D:
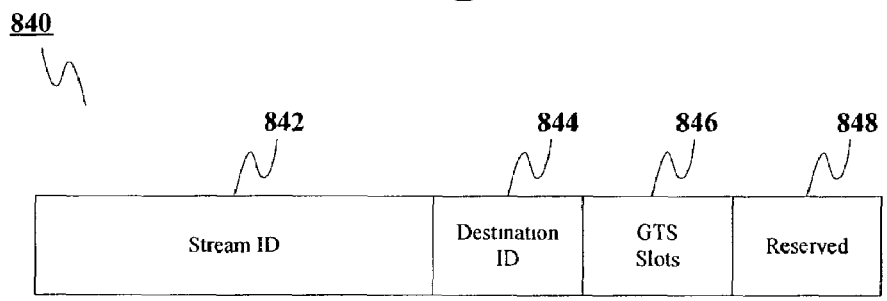
Figure 8E:
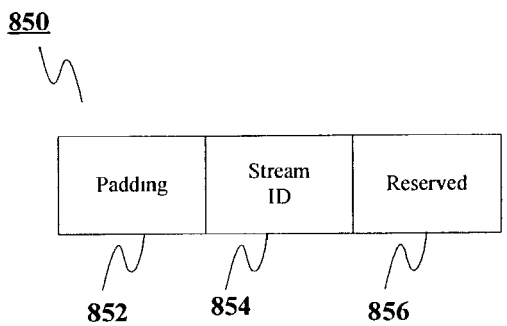
Figure 8F:
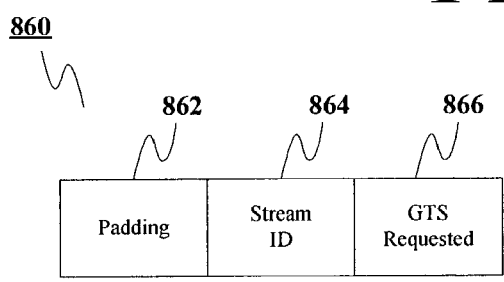
Figure 8G:
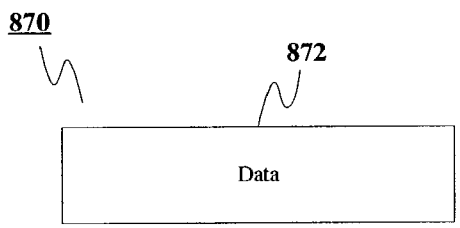
Figure 8H:
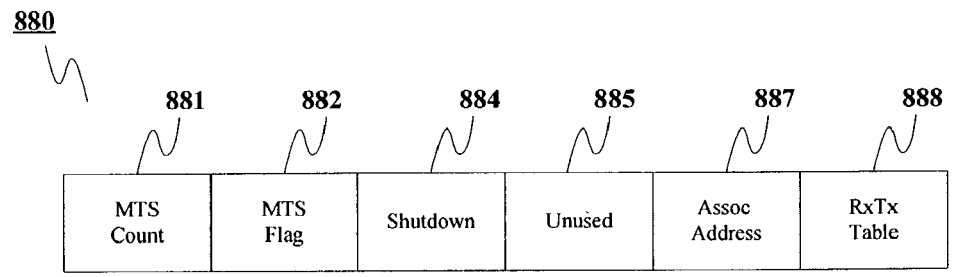

The payload 640 contains the data (if any) required by the current frame 600. FIGS. 8A through 8H are block diagrams showing exemplary payloads 640 from FIG. 6 according to a first preferred embodiment of the present invention. In particular, FIG. 8A is an association request payload; FIG. 8B is an association reply payload; FIG. 8C is a stream request payload; FIG. 8D is a stream reply payload; FIG. 8E is a stream free payload; FIG. 8F is a stream reallocation payload; FIG. 8G is a data payload; and FIG. 8H is a beacon payload.

FIG. 8A is a block diagram of shows an association request payload according to the first preferred embodiment. This is used when a MAC 420 in a new device requests to become a member of the network 300. As shown in FIG. 8A, the association request payload 810 includes the MAC address of the requestor 812.

FIG. 8B is a block diagram of an association reply payload according to the first preferred embodiment. This is used when the coordinator 310 responds to an association request frame 820. As shown in FIG. 8B, the association reply payload 820 includes a MAC address 822, a padding block 824, and a device ID 826.

The MAC address 822 is the address of the requester, and may be any unicast address.

The padding block 824 is a set of bits that are unused but allocated to the reply payload 820. This is because the frames are preferably aligned to octets and the padding block 824 is needed to provide correct alignment. In alternate embodiments where no octet alignment is used or where there is no need to pad to maintain octet alignment, the padding block could be eliminated. Preferably the value stored in the padding block 824 is zero, i.e., it is a string of zeros.

The device ID 826 is an address assigned to the requesting device by the coordinator 310. This is a 4-bit device ID in the preferred embodiment of FIG. 7A. The device ID 826 is returned with the value designated as Unassigned if the coordinator 310 refuses association.

FIG. 8C is a block diagram of a stream request payload according to the first preferred embodiment. This is used when a device 321-325 requests a stream to communicate with another device. As shown in FIG. 8C, the stream request payload 830 includes a destination address 832, a GTS lower value 834, a GTS upper value 836, and a reserved block 838.

The destination address 832 is the MAC address of the receiver of the packets in the current data stream. The destination address 832 may be any unicast address or the broadcast address. It may not be a multicast address.

The GTS lower value 834 is the minimum acceptable amount of GTSs that can be allocated to the data to be sent. The GTS upper value 836 is the maximum requested GTSs for the data transfer. In this embodiment the GTS lower value 834 and the GTS upper value 836 should be between 1 and 64, inclusive. In addition, the GTS lower value 834 should be less than or equal to the GTS upper value 836.

The reserved block 838 represents bits in the payload 640 that are not used in this embodiment. In alternate embodiments other parameters may be altered to reduce or eliminate the reserved block 838.

FIG. 8D is a block diagram of a stream reply payload according to the first preferred embodiment. This is used when the coordinator 310 responds to a stream request payload 830 from a device 321-325. As shown in FIG. 8D, the stream reply payload 840 includes a stream ID 842, a destination ID 844, a GTS slot value 846, and a reserved block 848.

The stream-ID 842 is the unique identifier given to the stream assigned to the requesting device 321-325. This value is set at a specified Stream Failure value if the allocation failed (e.g., coded as 0xF in the first preferred embodiment).

The destination ID 844 is the device ID of the designated receiver device. If no receiver can be found, this value is returned as Unassigned.

Upon a successful allocation, the GTS slot value 846 indicates the number of assigned slots. Upon a failed allocation, the GTS slot value 846 contains the amount of slots available for allocation.

The reserved block 838 represents bits in the payload 640 that are not used in this embodiment. In alternate embodiments other parameters may be altered to reduce or eliminate the reserved block 838.

FIG. 8E is a block diagram of a stream free payload according to the first preferred embodiment. This us used by a device, 321-325 to inform the coordinator 310 that it no longer intends to use a stream and that the corresponding GTS may be reused. As shown in FIG. 8E, the stream free payload 850 includes a padding block 852, a stream ID 854, and a reserved block 856.

The padding block 852 is a set of bits that are unused but allocated to the stream free payload 850. This is because the frames are preferably aligned to octets and the padding block 852 is needed to provide correct alignment. In alternate embodiments where no octet alignment is used or where there is no need to pad to maintain octet alignment, the padding block could be eliminated. Preferably the value stored in the padding block 852 is zero, i.e., it is a string of zeros.

The stream ID 854 is the same stream ID 842 as was returned in an associated stream reply payload 840. It provides a unique identifier for the assigned stream.

The reserved block 856 represents bits in the payload 640 that are not used in this embodiment. In alternate embodiments other parameters may be altered to reduce or eliminate the reserved block 856.

FIG. 8F is a block diagram of a stream reallocation payload according to the first preferred embodiment. This is used by a device to request an increased or decreased amount of GTSs for a stream. In alternate embodiments this may also be used to request changes in other parameters. As shown in FIG. 8F, the stream reallocation payload 860 includes a padding block 862, a stream ID 864, and a GTS requested value 866.

The padding block 862 is a set of bits that are unused but allocated to the stream reallocation payload 860. This is because the frames are preferably aligned to octets and the padding block 862 is needed to provide correct alignment. In alternate embodiments where no octet alignment is used or where there is no need to pad to maintain octet alignment, the padding block could be eliminated. Preferably the value stored in the padding block 862 is zero, i.e., it is a string of zeros.

The stream ID 864 is the same stream ID 842 as was returned in an associated stream reply payload 840. It provides a unique identifier for the assigned stream.

The GTS requested value 866 is the new desired amount of GTSs that the requestor wants. The coordinator 310 may deny the request and leave the GTS assignment unchanged, or it may allow the request and raise or lower the GTS assignment accordingly, or it may partially allow the request, raising or lowering the GTS assignment less than the amount requested.

FIG. 8G is a block diagram of a data payload according to the first preferred embodiment. This is used when data must be sent between two devices 310, 321-325. As shown in FIG. 8G, the data payload 870 includes a data block 872. This data block 872 is simply a string of data bits of a length set forth in the physical header 622.

FIG. 8H is a block diagram of a beacon payload according to the first preferred embodiment. This is used for the beacon frame 520 sent at the beginning of every superframe 500. As shown in FIG. 8H, the beacon payload 880 includes an MTS count block 881, an MTS flag 882, a shutdown value 884, an associated address 887, and an RxTx table. In the preferred embodiment there is also an reserved portion 885 between the shutdown value 884 and the associated address 887.

The MTS count block 881 shows the number of the current beacon in the beacon cycle. This is also used to identify the device, if any, that is currently assigned to the superframe 500, i.e., which has been granted use of the MTSs in that superframe 500.

The MTS flag 882 indicates whether the current beacon 510 is assigned to a device or not. This will be described in more detail below. In the first preferred embodiment, the MTS flag 882 is a single bit.

The shutdown value 884 is a value indicating whether the network 300 is preparing to shut down. This is preferably set to a False value during normal operation and to a True value for a set number of superframes 500 prior to a shutdown of the network 300. In the preferred embodiment referred to in FIG. 7A, the shutdown value is a single bit that is set at a False value (e.g., "0") for normal operation, but is set to a True value (e.g., "1") for three superframes prior to shutdown of the network 300. During the period of time that the coordinator has initiated the network shutdown procedure, no further requests will be granted.

The associated address 887 is a IEEE 802 MAC address of the device, if any, assigned to the current beacon.

The RxTx table 888 provides an indication of how the GTSs in the current superframe 500 will be allocated. In the embodiment referred to by FIG. 7A, each superframe includes 64 GTSs. (see FIG. 9.) The RxTx table 888 (called a channel time allocation (CTA) in other embodiments) stores the device IDs of the transmitter-receiver pairs that are assigned to each GTS. Thus, it stores 128 4-bit device IDs: 64 transmitter device IDs and 64 associated receiver device IDs. Alternate embodiments can use a channel time allocation (CTA) that includes this information relating to the number, duration, placement, and assignment of time slots.

In addition, some frame types do not require a payload 640. For example, acknowledgement (ACK) frames do not require a payload 640. In such frames 600, the payload 640 and FCS 650 may both be eliminated.

Frame Check Sequence (FCS)

The FCS 650 contains a cyclic redundancy check (CRC) used to confirm the payload 640 In the first preferred embodiment the FCS field is a 32 bit field that contains a 32-bit CRC. More detail regarding this can be found in American National Standards Institute, "Advanced Data Communication Procedures (ADCCP)", ANSI X3.66, 1979.

The FCS is calculated over the payload 640, which is referred to here as the calculation field. The FCS is calculated using the following standard generator polynomial of degree 32:

$$G(x) = x^{32} + x^{26} + x^{23} + x^{22} + x^{16} + \quad (3)$$
$$x^{12} + x^{11} + x^{10} + x^8 + x^7 + x^5 + x^4 + x^2 + x + 1$$

The FCS is the one's complement of the sum (modulo 2) of the following: (1) the remainder of $x^k x(x^{31}+x^{30}+x^{29}+ \ldots +x^2+x+1)$ divided (modulo 2) by G(x), k is the number of bits in the calculation field, and (2) the remainder after multiplication of the contents (treated as a polynomial) of the calculation field by $x^{32}$ and then division by G(x).

The FCS field 650 is preferably transmitted commencing with the coefficient of the highest order term.

In the first preferred embodiment, the initial remainder of the division is preset at the transmitter to all ones and is then modified by division of the calculation fields by the generator polynomial G(x). The ones complement of this remainder is then transmitted, with the high order bit first, as the FCS field 650.

At the receiver, the initial remainder is preset to all ones and the serial incoming bits of the calculation fields and FCS, when divided by G(x) results in the absence of transmission errors, in a unique non-zero remainder value. The unique remainder value is the polynomial:

$$x^{31} + x^{30} + x^{26} + x^{25} + x^{24} + x^{18} + x^{15} + x^{14} + \quad (4)$$
$$x^{12} + x^{11} + x^{10} + x^8 + x^6 + x^5 + x^4 + x^3 + x + 1$$

Postamble

The frame 600 may also include a postamble 660, which is a bit sequence set at the end of each frame 600 to assist in synchronization or perform other administrative functions. A postamble 660 can be eliminated in some embodiments. In fact, the preferred embodiment described with respect to FIG. 7A below does not use a postamble 660.

It should be understood that the frames described above are by way of example, and are not intended to be restrictive. Other frames with other frame formats can also be used. In particular, the present invention is usable with the frame formats used in the IEEE 802.15.3 standard.

SUPERFRAME EMBODIMENTS

Figure 9:
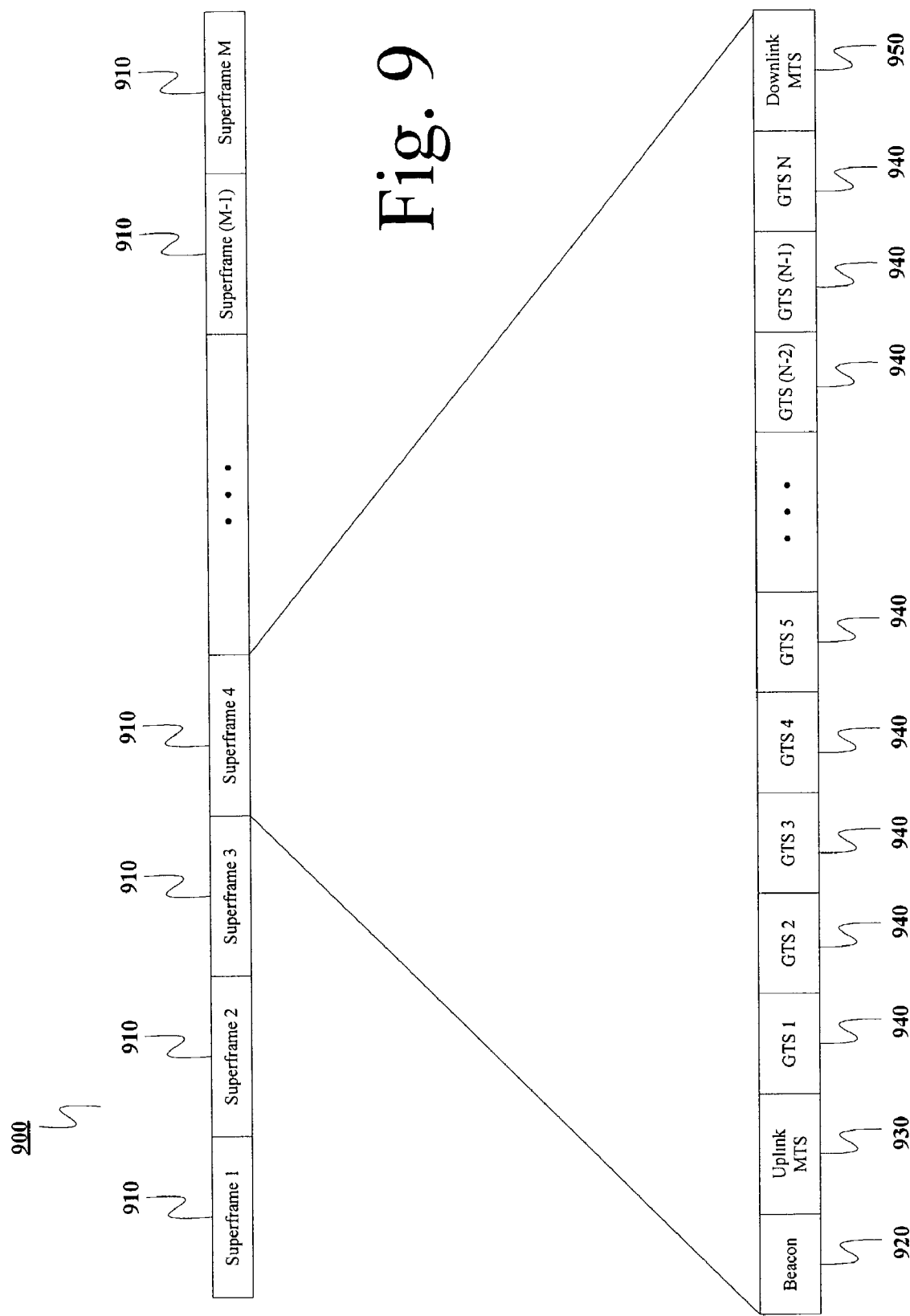
FIG. 9 is a block diagram showing an arrangement of elements in a superframe in accordance with the first preferred embodiment of the invention.
Figure 10:
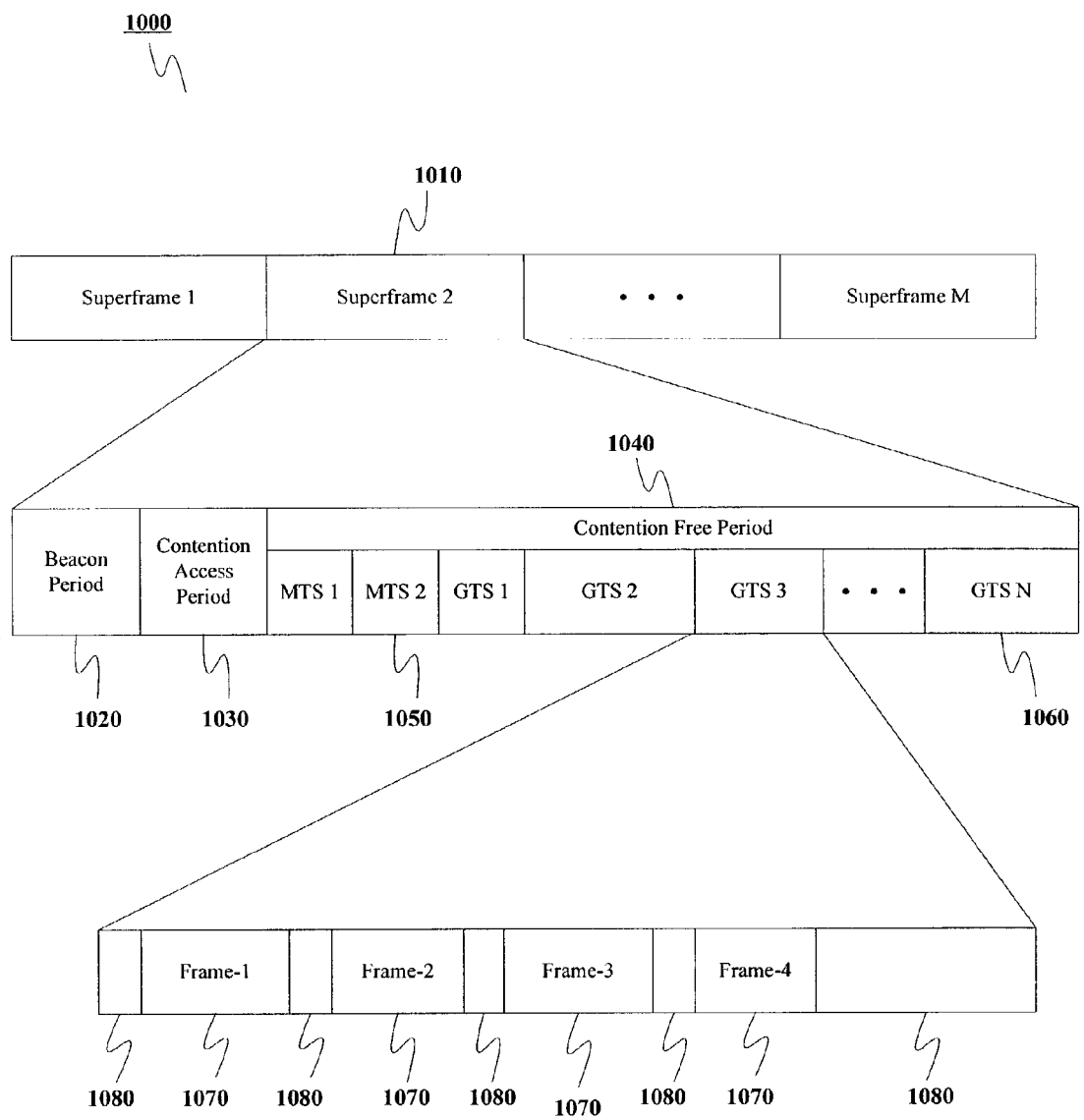
FIG. 10 is a block diagram showing an arrangement of elements in a superframe in accordance with the second preferred embodiment of the invention.

The exact design of a superframe 500 can vary according to implementation. FIGS. 9 and 10 show two preferred embodiments of a specific superframe design. FIG. 9 is a block diagram showing an arrangement of elements in a superframe in accordance with the first preferred embodiment of the invention. FIG. 10 is a block diagram showing an arrangement of elements in a superframe in accordance with the second preferred embodiment of the invention.

First Preferred Embodiment

As shown in FIG. 9, the transmission scheme 900 involves dividing the available transmission time into a plurality of superframes 910. This embodiment uses the MAC header 622 disclosed in FIG. 7A and the payloads 640 disclosed in FIGS. 8A through 8H.

In this embodiment each individual superframe 910 includes a beacon frame 920, an uplink MTS 930, a plurality of GTSs 940, and a downlink MTS 950.

The beacon frame 920 is a frame 600 whose payload 640 is a beacon payload 880, as shown in FIG. 8H. It indicates by association ID (known as a device ID in the IEEE 802.15.3 draft standard) a device 321-325 that is assigned to the current superframe 910. It also indicates via the RxTx table 888 the transmitter/receiver pairs that are assigned to the individual GTSs 940.

In an alternate embodiment, a stream index may be added to allow multiple streaming between the same source-destination pair. This can be shown, for example, in the CTA for the draft 802.15.3 standard, which allows for such multiple streaming.

The uplink MTS 930 is set aside for the device 321-325 assigned to the current superframe 910 to upload signals to the coordinator 310. All other devices 321-325 remain silent on the current channel during this time slot. In alternate embodiments that use multiple channels, all other stations on that channel must remain silent during an uplink MTS 930, though they may still transmit on alternate channels.

The plurality of GTSs 940 (64 in the first preferred embodiment) are the time slots set aside for each of the devices 310, 321-325 to communicate with each other. They do so in accordance with the information set forth in the RxTx table 888 in the beacon 920. Each GTS 940 is preferably large enough to transmit one or more data frames. When a device pair is assigned multiple GTSs 940, they are preferably contiguous.

The downlink MTS 950 is set aside for the coordinator 310 to download signals to the device 321-325 assigned to the current superframe 910. All other devices 321-325 may ignore all transmissions during this time slot.

The length of the superframe 910 is fixed, and is preferably chosen to have a duration between 10 and 30 ms in order to minimize the data buffering requirements.

The lengths of the uplink and downlink MTSs 930 and 950 must be chosen to handle the largest possible management frame, an immediate ACK frame, and the receiver-transmitter turnaround time. For the GTSs 940, the length and number must be chosen to accommodate the specific requirements of frames 600 to be transmitted, e.g., short MPEG frames, large frames of the maximum allowable length, and streaming vs. immediate ACK operation.

The length of any given payload 640 is limited by the length field in the physical header 622 and the FCS 650. In the first preferred embodiment the length field in the physical header 622 is 15-bits and the FCS 650 is 4 bytes. Thus, the payload 640 can never be bigger than $2^{15}-4=32766$ bytes.

Although the first preferred embodiment uses 64 GTSs, one UMTS placed before the GTSs, and one DMTS placed after the GTSs, the number, distribution, and placement of GTSs, UMTSs, and DMTSs may be varied in alternate embodiments as required by different implementations.

Second Preferred Embodiment

As shown in FIG. 10, the transmission scheme 1000 involves dividing the available transmission time into a plurality of superframes 1010. This embodiment uses the MAC header 624 disclosed in FIG. 7B. The payloads 640 used are preferably those used in the IEEE 802.15.3 standard.

In this embodiment the data transmission scheme 1000 includes transmitting successive superframes 1010 in time across the network 300. Each superframe 1010 includes a beacon 1020, an optional contention access period (CAP) 1030, and a contention free period (CFP) 1040. The contention free period 1040 may include one or more management time slots (MTSs) 1050 and one or more guaranteed time slots (GTSs) 1060.

Management time slots 1050 can be downlink management time slots (DMTSs) in which information is sent from the coordinator 310 to a non-coordinator device 321-325, or uplink management time slots (UMTSs) in which information is sent from a non-coordinator device 321-325 to the coordinator 310.

In this preferred embodiment two management time slots 1050 are used per superframe 1010, one uplink and one downlink, though alternate embodiments could choose different numbers of management time slots 1050 and mixtures of uplink and downlink. MTSs can also be shared among multiple devices 321-325. In this case a convention resolution method, such as slotted Aloha, must be used. In addition, if a CAP 1030 is used to pass administrative information, the use of MTSs 1050 may be reduced or eliminated.

In the second preferred embodiment there are as many guaranteed time slots 1060 as there are active primary and secondary wireless links 330 and 340. However, this may change in alternate embodiments. In any given superframe 500 there may be greater or fewer guaranteed time slots 1060 than there are active primary and secondary wireless links 330 and 340. In this case the coordinator 310 will designate how the devices 310, 321-325 should use the available guaranteed time slots 1060.

The guaranteed time slots 1060 in this embodiment are preferably dynamic in size. Each transmitter-receiver pair that is allocated a GTS 1060 is also told the duration of the GTS 1060 that the pair is assigned to the beacon. These durations may be of different sizes for different GTSs within a single superframe 1010. Furthermore, the length and position of a given GTS 1060 may change across different superframes 1010, limited only by the ability of the coordinator 310 to successfully inform the non-coordinator devices 321-325 of the change. The starting times and durations of the guaranteed time slots 1060 are determined by the coordinator 310 and sent to the devices 321-325 during the contention access period 1030 or one of the management time slots 1050, as implemented.

In the second preferred embodiment the coordinator 310 uses the beacon 1020 (in whatever format it is) and the MTSs to coordinate the scheduling of the individual devices 310, 321-325 into their respective guaranteed time slots 1060. All devices 310, 321-325 listen to the coordinator 310 during the beacon period 1020. Each device 321-325 will receive zero or more time slots 1050, 1060, being notified of each start time and duration from the coordinator 310 during the beacon period 1020. The coordinator 310 automatically allocates management time slots 1050 to each device 321-325. However, guaranteed time slots 1060 are only assigned when the device 321-325 requests them.

Channel time allocation (CTA) fields in the beacon 1020 include start times, packet duration, source device ID, destination device ID, and a stream index. This beacon information uses what is often called TLV format, which stands for type, length, and value. As a result, each device knows when to transmit and when to receive. In all other times devices 310, 321-325 may cease listening and go into a power conservation mode. The beacon period 1020, therefore, is used to coordinate the transmitting and receiving of the devices 310, 321-325.

The coordinator 310 sends the beacon 1020 to all of the non-coordinator devices 321-325 at the beginning of each superframe 1010 the beacon 1020 tells each non-coordinator device 321-325 the duration or superframe 1010 as well as other information about its MAC address. Each beacon 1020 will also contain information that is not precisely a CTA. One piece of information will define the beacon period 1020 and describe the start time and the duration for the beacon period 1020. Another will define the contention access period 1030 (if any) and describe the start time and the duration for the contention access period 1030. Each beacon can also have multiple CTAs. There will be a CTA for each of the time slot 1050, 1060 (whether MTS or GTS). Using dynamic time slots, the slot assignments can change the CTAs every superframe.

During transmission, each device 310, 321-325 must hear the beacon 1020 so that it will know what time slots 1050, 1060 have been assigned to it as either a transmitter or receiver. If the device misses the beacon 1020, it must listen to the entire superframe 1010 just in case it is receiving data. Furthermore, in some implementations it may not be allowed to transmit for the duration of the superframe 1010 because it does not know when it is permitted to transmit. This is detrimental to the system because it may lead to interruptions in data transmission.

The network can pass control and administrative information between the coordinator 310 and the various devices 321-325 through the optional contention access period 1030, the management time slots 1050, or both. For example, this can involve information about new devices that want to join the network 300. The particular implementation will determine what particular option is used: it could include a contention access period 1030, one or more management time slots 1050, or some combination of both.

Individual devices 310, 321-325 transmit frames during the contention free period 1040 according to the schedule set forth in the beacon 1020. The pair of devices 310, 321-325 assigned to a given guaranteed time slots 1060 use that GTS 1060 assigned to them to transmit frames 1070 between each other. These may be data frames from the designated transmitter to the designated receiver, or acknowledgement (ACK) frames from the designated receiver to the designated transmitter.

As noted above, guard times 1080 are preferably provided between frames to account for errors in clock accuracies and differences in propagation delays based on spatial positions of the devices 310, 321-325.

In superframes without a CAP 1030 or an MTS 1050, it may be desirable to put in a delay between the beacon 1020 and the first GTS 1050, to allow individual devices 321-325 time to process the beacon 1020. Otherwise the devices 321-325 assigned to the first GTS 1060 may not enter into a transmission/listening mode in time to use the assigned slot 1060.

Cyclic Beacons

One problem in an ad hoc network 300 is coordinating the entry and departure of devices into and out of the network 300, and coordinating the passage of administrative frames between the coordinator 310 and the devices 321-325. The present invention addresses this problem by using cyclic beacons to monitor the network 300 and the devices 310, 321-325 in it.

Each network preferably has a set number N of allowable devices 310, 321-325. In preferred embodiments N is a power of two, such as four or eight (i.e., a coordinator 310 and three non-coordinator devices 321-325, or a coordinator 310 and seven non-coordinator devices 321-325), although the exact number N of allowable devices can vary. A network's maximum value for N can be determined by finding a number of devices 310, 321-325 for which the network 300 can spread the available transmission time and still allow each to communicate fully and frequently enough to maintain a desired level of operation. A power of two is preferable but not necessary.

The superframes 500 are grouped together in batches of N superframes 500. Within this group, one superframe 500 is assigned to each device 310, 321-325 currently in the network 300. Preferably a set superframe (e.g., the first superframe) is always assigned to the coordinator 310.

Each non-coordinator device 321-325 can then use the superframe 500 assigned to it to send and receive administrative commands from the coordinator 310 (e.g., in management time slots). The superframe 500 allocated to the coordinator 310 can be used to allow devices outside of the network 300 to communicate with the coordinator, e.g., to request entry to the network 300. They can also be used for the coordinator to send information to all of the non-coordinator devices 321-325. In addition, in some embodiments unassigned superframes 500 may also be used for devices outside of the network to communicate with the coordinator 310.

The coordinator 310 will indicate in the beacon 510 which device 310, 321-325 is assigned to a given superframe 500. For this reason the assigning of superframes 500 to a given device 310, 321-325 is sometimes referred to as assigning the beacons 510 to a given device 310,321-325.

In alternate embodiments the coordinator 310 could assign multiple devices to a single superframe. For example, each superframe could include management time slots for two devices. As a result, two devices could be associated with the superframe before it would become "assigned."

Figure 11:
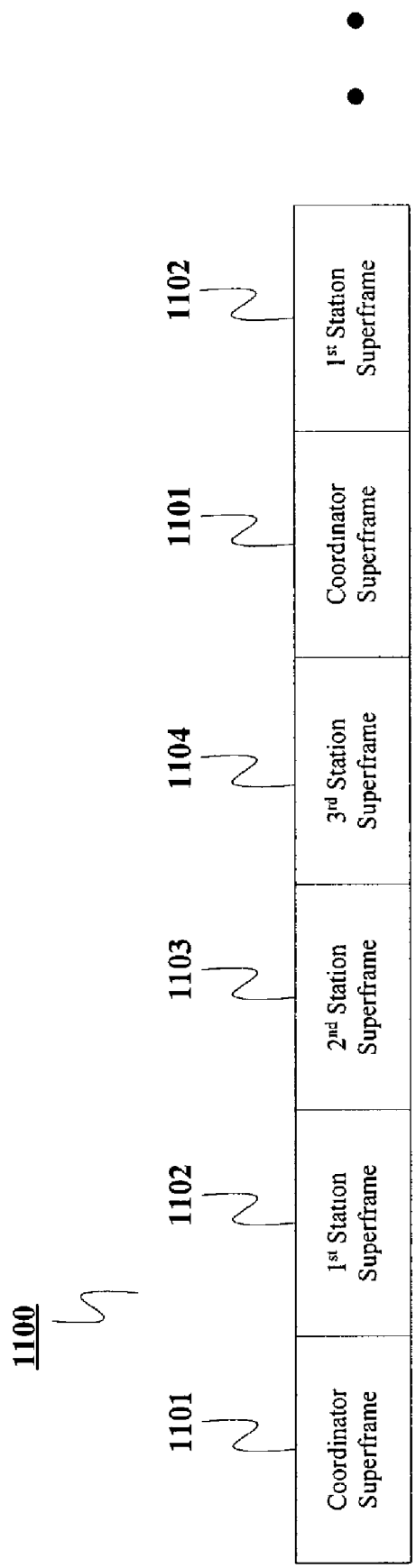
FIG. 11 is a block diagram showing the repetition of superframes in a cyclic beacon superframe structure.

FIGS. 11 and 12A-12D are block diagrams showing a cyclic beacon superframe structure according to a preferred embodiment of the present invention. FIG. 11 is a block diagram showing the repetition of superframes in a cyclic beacon superframe structure. FIGS. 12A-12D are block diagrams showing the structures of the superframes of FIG. 11.

In the embodiment disclosed in FIGS. 11 and 12A-12D, four devices 310, 321-325 are allowed into the network 300. This means that the network 300 will allow a maximum of one coordinator 310 and three non-coordinator devices 321-325. Alternate embodiments could vary this number. For example, alternate embodiments could have 8 or 16 devices.

Superframe Structure

As shown in FIG. 11, each device 310, 321-325 is assigned a superframe. The coordinator is assigned a coordinator superframe 1101; the first device is assigned a first non-coordinator device superframe 1102; the second non-coordinator device is assigned a second device superframe 1103; and the third non-coordinator device is assigned a third device superframe 1104. These superframes 1101, 1102, 1103, and 1104 are repeated in series for as long as the network 300 is operating.

This is true even if there are fewer than four devices 310, 321-325 in the network 300. For example, if there were only two devices in the network 300 (i.e., a coordinator 310 and one non-coordinator device 321-325), the transmission time would still be divided up into four superframes 1101, 1102, 1103, and 1104 with each device 310, 321-325 assigned to a single superframe.

However, in alternate embodiments the coordinator 310 could choose a cycle such that there are only a set number of unassigned superframes (e.g., one) in a network 300 that isn't full, up to the maximum number of allowable superframes. For example, in the circumstances described above, with a maximum number of four devices but only two devices present, the coordinator 310 could cycle through three superframes 1101, 1102, and 1103, two assigned and one unassigned.

Figure 12A:
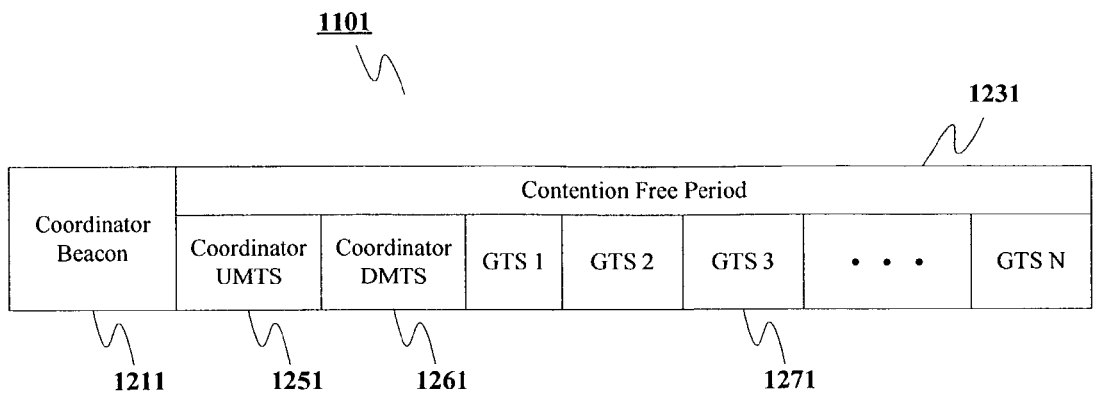
FIGS. 12A-12D are block diagrams showing the structures of the superframes of FIG. 11.

As shown in FIG. 12A, the coordinator superframe 1101 includes a coordinator beacon 1211 and a contention free period 1231. The contention free period 1231 includes a coordinator uplink MTS (UMTS) 1251, a coordinator downlink MTS (DMTS) 1261, and a plurality of GTSs 1271.

The coordinator beacon 1211 includes information indicating that it is assigned to the coordinator 310 (there will always be a coordinator 310 in any network). The coordinator UMTS 1251 is used for coordinator broadcasts to the whole network or for association requests from a device attempting to join the network; the coordinator DMTS 1261 is used for coordinator broadcasts to the whole network; and the GTSs 1271 are used for transmitting information frames between the devices 310, 321-325.

Figure 12B:
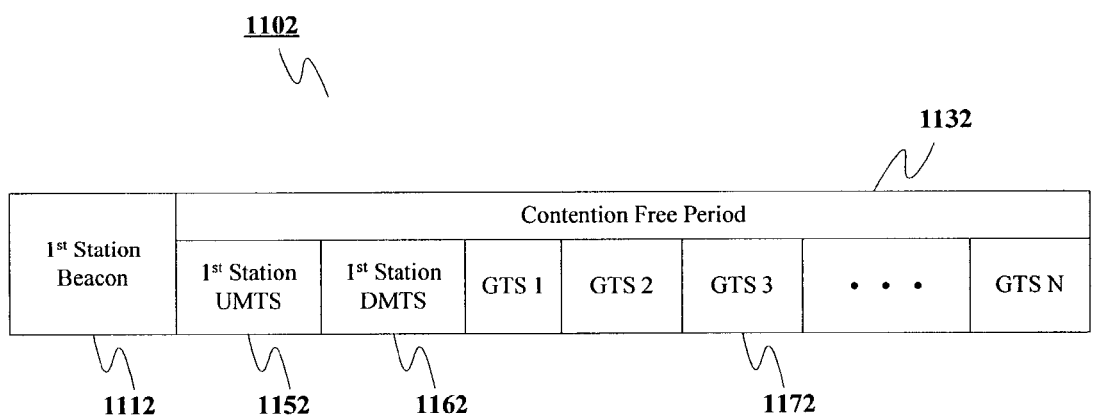

As shown in FIG. 12B, the first device superframe 1102 includes a first device beacon 1212 and a first device free period 1232. The contention free period 1232 includes a first device uplink MTS (UMTS) 1252, a first device downlink MTS (DMTS) 1262, and a plurality of GTSs 1272.

The first device beacon 1212 includes information indicating whether the first device superframe 1102 is assigned to a device 310, 321-325 and if so, what device 310, 321-325 it is assigned to. The first device UMTS 1252 is used for sending administrative requests from the first device (if one is assigned) to the coordinator 310; the first device DMTS 1262 is used for sending administrative instructions from the coordinator 310 to the first device (if one is assigned); and the GTSs 1272 are used for transmitting information frames between the devices 310, 321-325.

Figure 12C:
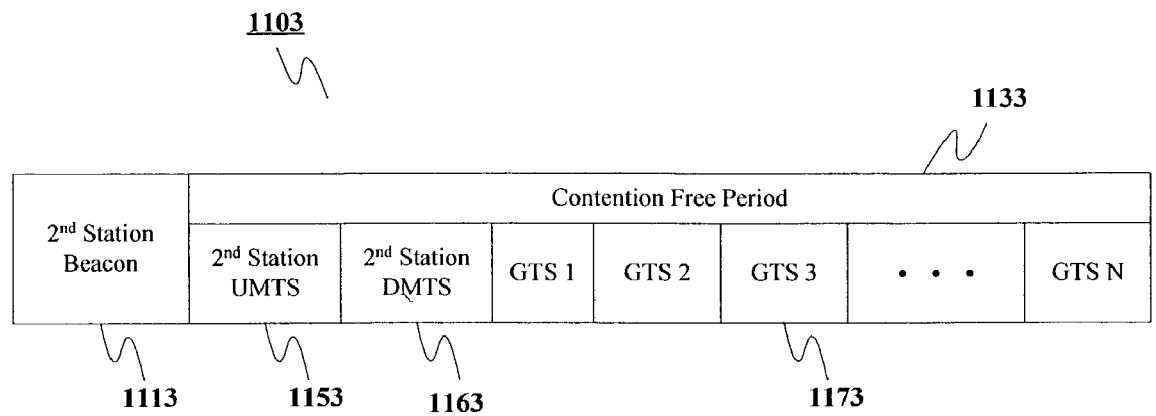

As shown in FIG. 12C, the second device superframe 1103 includes a second device beacon 1213 and a second device free period 1233. The contention free period 1233 includes a second device uplink MTS (UMTS) 1253, a second device downlink MTS (DMTS) 1263, and a plurality of GTSs 1273.

The second device beacon 1213 includes information indicating whether the second device superframe 1103 it is assigned to a device 310, 321-325 and if so, what device 310, 321-325 is assigned to. The second device UMTS 1253 is used for sending administrative requests from the second device (if one is assigned) to the coordinator 310; the second device DMTS 1263 is used for sending administrative instructions from the coordinator 310 to the second device (if one is assigned); and the GTSs 1273 are used for transmitting information frames between the devices 310, 321-325.

Figure 12D:
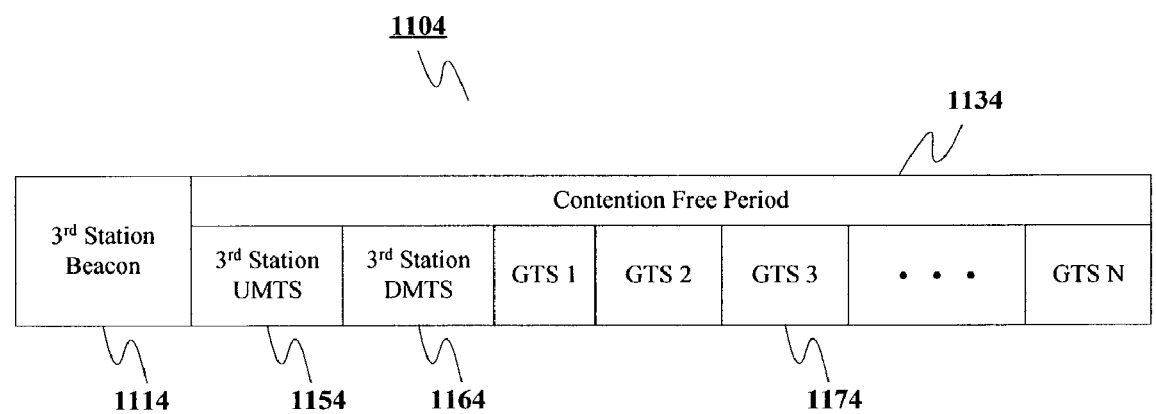

As shown in FIG. 12D, the third device superframe 1104 includes a third device beacon 1214 and a third device free period 1234. The contention free period 1234 includes a third device uplink MTS (UMTS) 1254, a third device downlink MTS (DMTS) 1264, and a plurality of GTSs 1274.

The third device beacon 1214 includes information indicating whether the third device superframe 1104 is assigned to a device 310, 321-325 and if so, what device 310, 321-325 it is assigned to. The third device UMTS 1254 is used for sending administrative requests from the third device (if one is assigned) to the coordinator 310; the third device DMTS 1264 is used for sending administrative instructions from the coordinator 310 to the third device (if one is assigned); and the GTSs 1274 are used for transmitting information frames between the devices 310, 321-325.

This embodiment is shown as not having a CAP 520 to illustrate that the CAP 520 may be eliminated in some designs. In this embodiment administration between the coordinator 310 and the non-coordinator devices 321-325 is accomplished solely through the use of MTSs 1251, 1261, 1252, 1262, 1253, 1263, 1254, and 1264. However, alternate embodiments could include a CAP 520 in each superframe 1101, 1102, 1103, and 1104.

In addition, this embodiment is shown as having two MTSs, a UMTS 1251, 1252, 1253, 1254 and a DMTS 1261, 1262, 1263, 1264. As noted above, the number, distribution, and placement of the MTSs could be modified in alternate embodiments.

Beacon Information

As noted above, each beacon includes two important pieces of information regarding its assignment status: (1) whether it's assigned to a device 310, 321-325, and (2) if it is assigned, which device 310, 321-325 it is assigned to. These two pieces of information can be disclosed in a variety of different ways.

For example, in the first preferred embodiment, the beacon frame includes a bit indicating when a superframe is assigned and when it is free (the MTS flag 882) and a counter indicating the device ID of the device 310, 321-325 (if any) assigned to the superframe associated with that beacon (the MTS count 881).

A device listening to a given superframe can tell whether it is assigned by checking the MTS flag 882. And if the MTS flag 882 indicates that the superframe is assigned, then the device checks the MTS count 881 to see what device is assigned to it. A device in the network 300 can use this information to find the superframe that it is assigned to. A device outside of the network 300 can use this information to find an empty superframe to request, or the coordinator superframe to pass other administrative information to the coordinator 310.

In alternate embodiments the beacon frame could simply include a register that holds an identifier (device ID, MAC address, etc.) associated with the device assigned to a given superframe. And if no device is assigned to the superframe, the register could be filled with a phantom address that corresponds to none of the allowable devices, but is indicative of an unassigned superframe.

A device listening to a given superframe can tell whether it is assigned by checking this identifier register. If the register has a valid identifier (e.g., a valid device ID) the device would know that the superframe was assigned. In particular, if the register has the identifier assigned to the coordinator, the device will know that this particular superframe is assigned to the coordinator. And if the identifier register has the phantom address, the device would know that the superframe was unassigned, and could act accordingly.

As above, a device in the network 300 can use this information to find the superframe that it is assigned to. A device outside of the network can use this information to find an empty superframe to request, or the coordinator superframe to pass other administrative information to the coordinator 310. It can also use this information to find the MAC address for a device that is assigned to a certain beacon.

During the superframe 1102, 1103, 1104 assigned to it, a non-coordinator device 321-325 can use the UMTSs and DMTSs to pass administrative frames to and from the coordinator 310. During superframes not assigned to it, a given device will remain silent during the MTSs of that superframe. However, it can and will freely use the GTSs assigned to it during that superframe.

When a new device wishes to enter a network, it begins by listening for a beacon. Once it finds the beacon, it waits until it hears an unassigned superframe. If it finds an unassigned superframe, it sends a join request during an uplink MTS in that superframe.

If, however, it goes through an entire batch of N superframes without detecting an unassigned superframe, it knows the network is full, and can take appropriate steps, e.g., sending an error message to its user or higher layers, retying after a set period of time, changing channels, etc.

As noted above, alternate embodiments could assign multiple devices to a single superframe, allocating management time slots accordingly. In this case, the superframe would remain unassigned until it was assigned to its maximum number of devices. New devices checking the assignment status of the superframe would have to check to see if the there were any free spaces in the superframe. As above, this could be done with a flag or a series of device IDs indicating the devices assigned to the superframe.

Joining or Starting a Network

Figure 13:
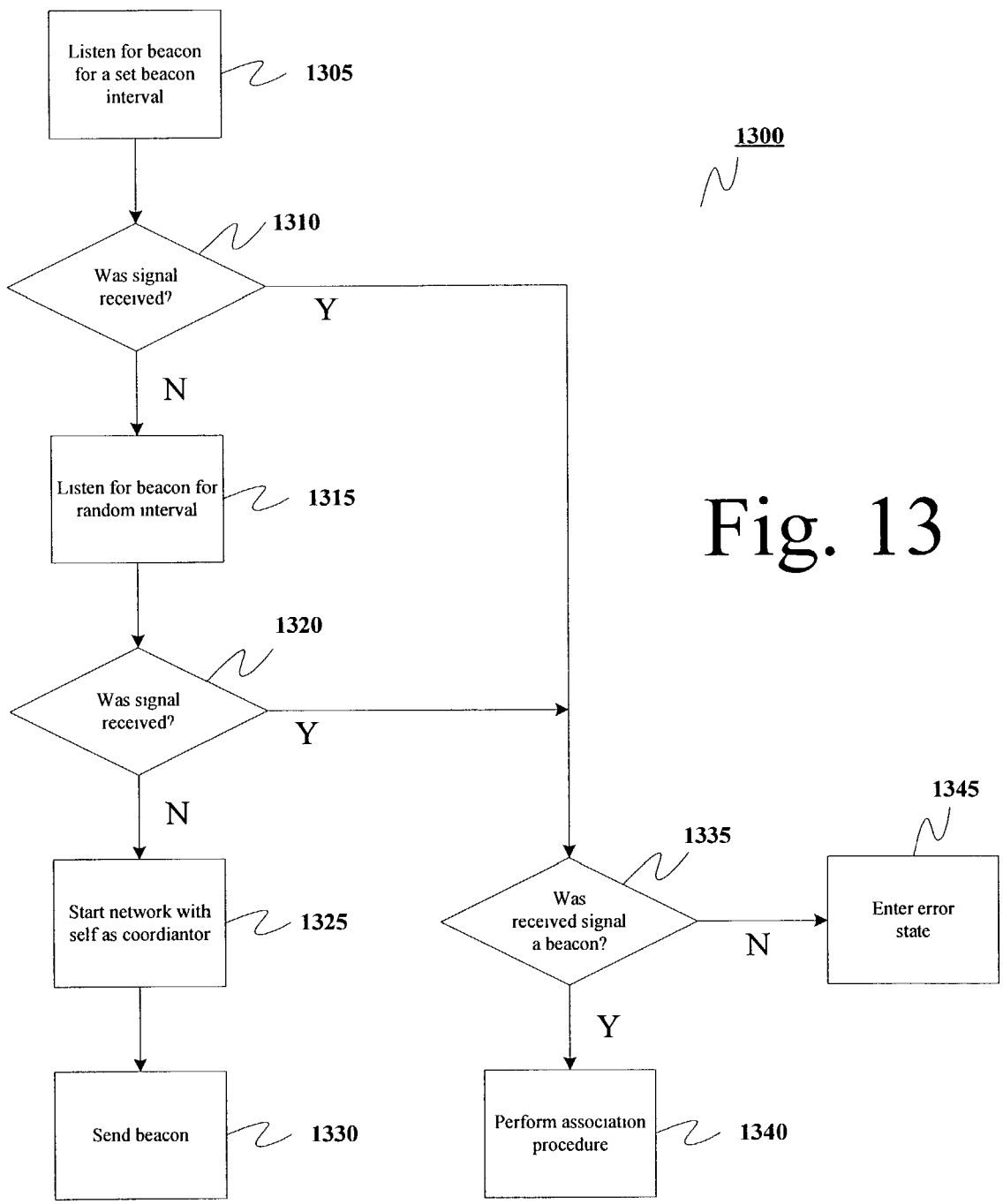
FIG. 13 is a flow chart of a start process for identifying whether there is an existing network according to a preferred embodiment of the present invention.
Figure 14:
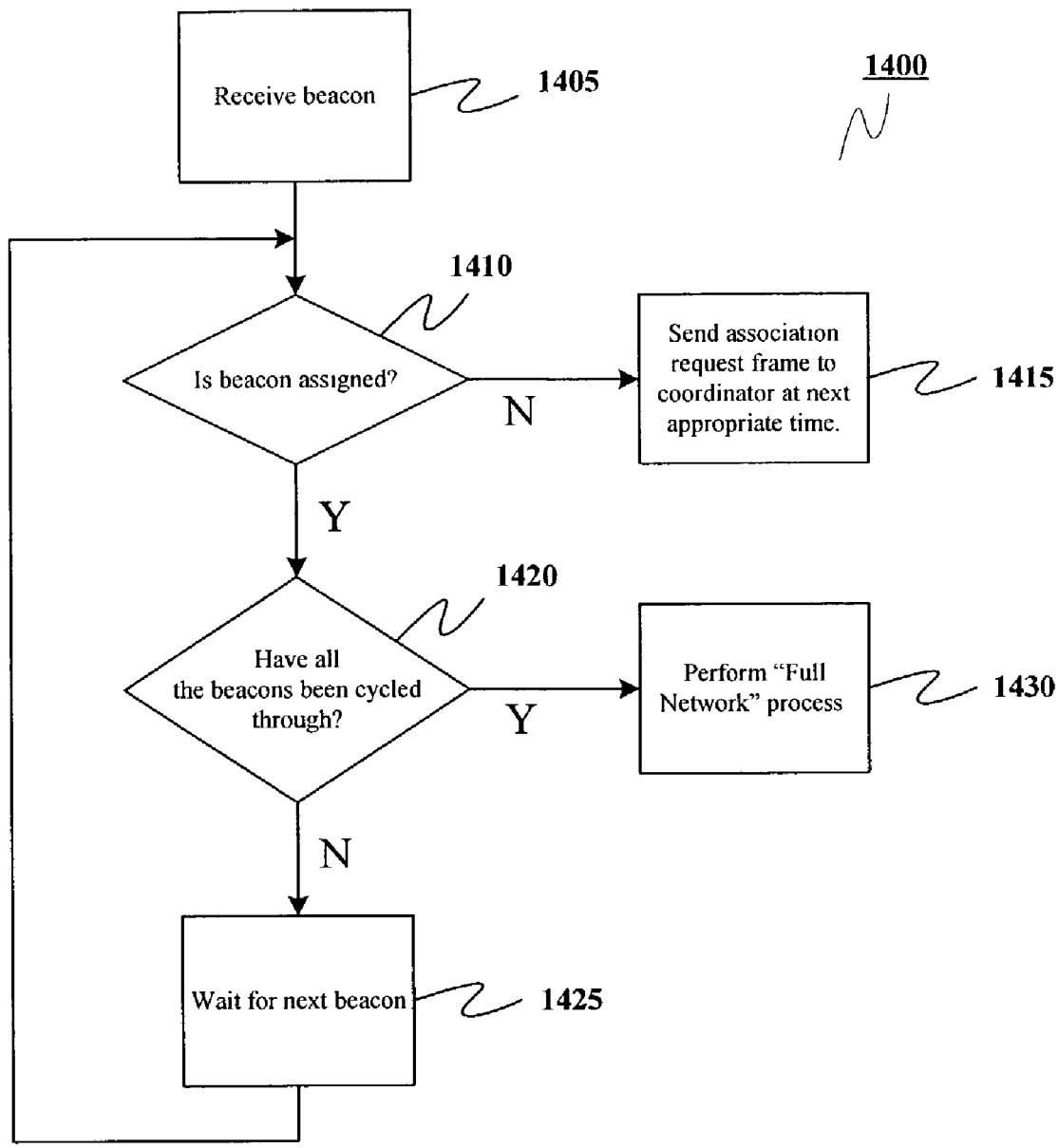
FIG. 14 is a flow chart of an association process according to a preferred embodiment of the present invention.
Figure 15:
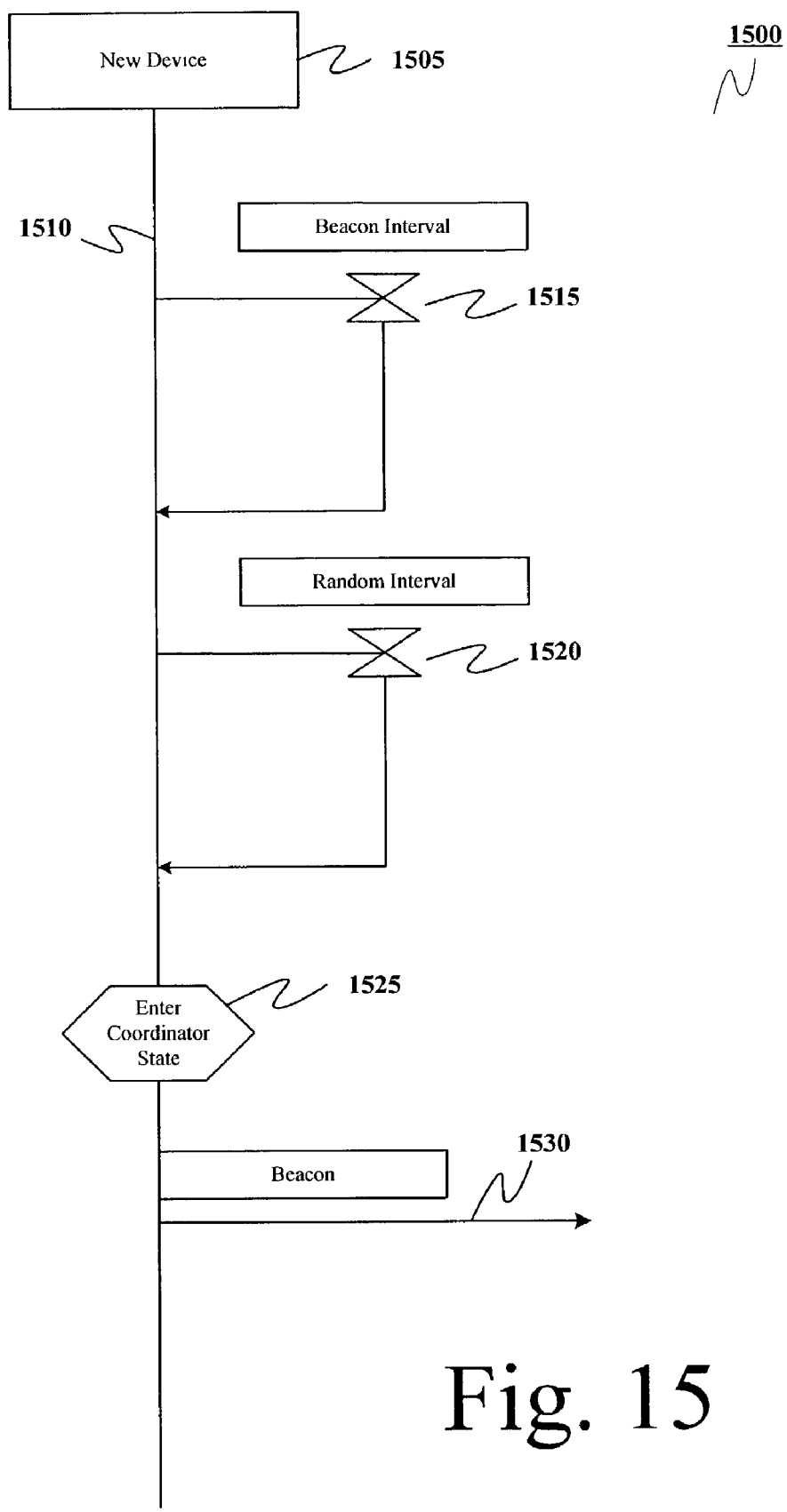
FIG. 15 is an SDL message sequence chart of a new device starting a network according to a preferred embodiment of the present invention.
Figure 16:
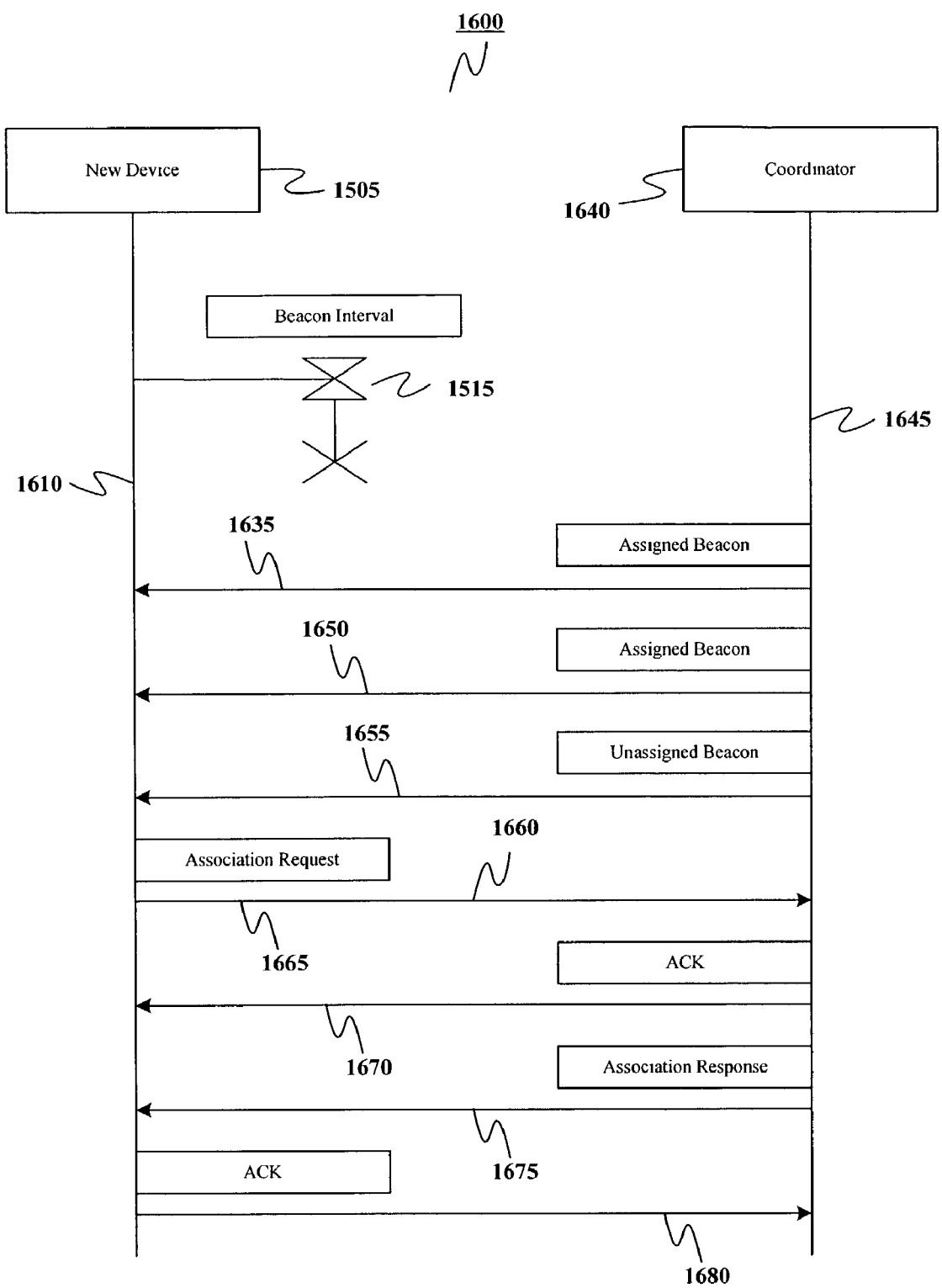
FIG. 16 is an SDL message sequence chart of an exemplary start and association process according to a preferred embodiment of the present invention.

FIGS. 13-16 illustrate how a device determines whether a network exists and proceeds to either attempt to join the network or create a network if none exists. FIG. 13 is a flow chart of a start process for identifying whether there is an existing network according to a preferred embodiment of the present invention. FIG. 14 is a flow chart of an association process according to a preferred embodiment of the present invention. FIG. 15 is an SDL message sequence chart of a new device starting a network according to a preferred embodiment of the present invention. FIG. 16 is an SDL message sequence chart of an exemplary start and association process according to a preferred embodiment of the present invention.

As shown in FIG. 13, a new device goes through the following start procedure 1300 to determine whether a network is in existence. In this start procedure 1300, the new device will first wait a set beacon interval, checking to see whether it hears a beacon 510 from an existing network. (Step 1305) The beacon interval should be at least the duration of a superframe 500, since a beacon 510 is generally only repeated once per superframe 500.

If at the end of the beacon interval no signal was received (Step 1310), the device will preferably listen for the beacon for an additional random interval. (Step 1315) This random interval is preferably shorter than the beacon interval, but longer than a beacon transmit duration.

If at the end of the random interval no signal was received (Step 1320), the device will assume that there is no network 300 and will start a new network 300 with itself as the coordinator 310. (Step 1325) Then the device (now coordinator 310) will proceed to send out a new beacon 510 (Step 1330) and will proceed with normal operation as a coordinator 310.

If, however the device received a signal after either the beacon interval (Step 1310) or the random interval (Step 1320), the device will determine whether that signal is a beacon 510. (Step 1335)

If the received signal is a beacon 510, the device will determine that there is an existing network 300 and will perform an association procedure with the coordinator 310 of that network, requesting to join. (Step 1340)

But if the received signal is not a beacon 510, the device will enter into an error state because the desired bandwidth is blocked by another signal. (Step 1345) In this case the device may switch channels, try again later, give up and send an error message to its user or higher levels, etc., depending upon the particular implementation.

The random interval is not required, but is included in the preferred embodiments to facilitate operation. This is because there are certain occurrences that may cause multiple devices to simultaneously enter into a start procedure 1300. For example, if a network 300 were to be disbanded, a number of devices would all begin the start procedure 1300 immediately upon the disbanding of the network 300. By including a random interval (Step 1315) this procedure reduces the chance that multiple devices will try to send a new beacon (Step 1330) at the same time, and thus the chance that a collision of beacons will occur.

As shown in FIG. 14, each device performs an association procedure 1400 when it desires to enter into an existing network 300. The association procedure 1400 starts as the device receives a beacon 510. (Step 1405)

As noted above with respect to FIG. 11, the superframes 500 in the network 300 are divided into N superframes 1101, 1102, 1103, 1104 (one for each potential device in the network 300), which are cyclically repeated during network operation. These superframes 1101, 1102, 1103, 1104 are assigned to each device position, and each indicates its status in its associated beacon 510.

Upon receipt of a beacon 510 in Step 1405, the device determines whether the beacon 510 indicates that the current superframe 1101, 1102, 1103, 1104 is assigned (sometimes referred to as having the beacon 510 assigned). (Step 1410)

If the received beacon 510 indicates that the current superframe 1101, 1102, 1103, 1104 is unassigned, the device then sends an association request frame to the coordinator 310 at the next appropriate time, e.g., during the UMTS of the unassigned superframe. (Step 1415) If two devices collide (i.e., they simultaneously try and transmit to the coordinator 310), they use a contention resolution algorithm, e.g., slotted Aloha.

If the received beacon 510 did indicate that it was assigned in step 1410, then the device determines whether it has cycled through all of the possible beacons. (Step 1420) In other words, it determines whether it has checked N consecutive beacons, where N is the total number of allowable devices 310, 321-325 in the network 300.

If the device has not cycled through all possible beacons, it waits for the next beacon (Step 1425) and then processes that beacon as it did the previous one. (Step 1410 and following steps). H Once it finishes processing all of the beacons and determines that they are all assigned, the device determines that the network is full and performs any required "Full Network" process. (Step 1430) This can include informing the operator or higher layers of the device that the network is full, switching channels, or waiting until a later time to try again.

FIG. 15 is an exemplary SDL message sequence chart 1500 of a new device performing a start process. As shown in FIG. 15, a new device 1505 proceeds along a new device timeline 1510 in performing the start process.

First, the new device 1505 sets a beacon timer 1515 for the beacon interval and waits for that time period, looking for an incoming beacon. (Performing Step 1305 from FIG. 13)

At the end of the beacon interval the new device 1505 has not received an incoming beacon, so it sets a random timer 1520 for a random interval and waits for that time period, again looking for an incoming beacon. (Taking branch "N" from Step 1310 and performing Step 1315 from FIG. 13)

At the end of the random interval the new device 1505 has still not received an incoming beacon, so it enters a coordinator state 1525, starting a new network 300 with itself as a coordinator 310. (Taking branch "N" from Step 1320 and performing Step 1325 from FIG. 13)

Once in the coordinator state 1525, the new device 1505 begins sending beacons 1530, and continues to operate as a coordinator 310 for the new network 300. (Performing Step 1330 from FIG. 13)

FIG. 16 is an SDL message sequence chart of an exemplary start and association process. In this process the allowable network size is four devices.

As shown in FIG. 16, a new device 1605 proceeds along a new device timeline 1610 in beginning the start process 1500 and continuing to the association process. First, the new device 1505 sets a beacon timer 1515 for the beacon interval and waits for that time period, looking for an incoming beacon. (Performing Step 1305 from FIG. 13)

In this case, before the beacon interval ends, the new device 1505 receives a beacon 1635 sent by a coordinator 1640 along a coordinator timeline 1645. (Taking branch "Y" from Step 1310 from FIG. 13) This interrupts the beacon interval timer 1515 and the new device 1505 begins processing the incoming beacon. In this case the new device 1505 determines that the incoming signal is a beacon, and starts an association procedure. (Performing step 1335 and taking branch "Y" from FIG. 13)

The new device 1505 determines that the first incoming beacon 1635 is an assigned beacon. This is only the first beacon that it received, so it proceeds to wait for the next beacon. (Taking branch "Y" from Step 1410, taking branch "N" from Step 1420, and performing Step 1425 from FIG. 14)

The new device 1505 then receives the next beacon 1650 and determines that this beacon is also assigned. It checks how many beacons it has cycled through so far (two) and determines that it has still not cycled through all allowable beacons. Therefore it proceeds to wait for the next beacon. (Performing Step 1405, taking branch "Y" from Step 1410, taking branch "N" from Step 1420, and performing Step 1425 from FIG. 14)

The new device 1505 then receives the next beacon 1655 and determines that this beacon is unassigned. It then waits until the next appropriate time that the coordinator will be listening and sends an association request 1660 to the coordinator 1640. (Performing Step 1405, taking branch "N" from Step 1410, and performing Step 1415 from FIG. 14)

Upon receiving the association request 1660 from the new device 1505, the coordinator 1640 sends an acknowledgement (ACK) 1670 and an association response 1675 to the new device 1505. In this case, the coordinator 1640 assigns the unassigned beacon and its associated superframe to the new device 1505. The new device 1505 sends an ACK 1680 to the coordinator 1640 and proceeds with normal operation in the network 300.

Obviously, numerous modifications and variations of the present invention are possible in light of the above teachings. For example, though described in the context of a wireless network, the methods of this disclosure would be applicable to a wired network. It is therefore to be understood that within the scope of the appended claims, the invention may be practiced otherwise than as specifically described herein.

What is claimed is:

1. A method for a remote device to monitor and communicate with a wireless network, comprising:
   receiving a beacon at the remote device, the beacon including beacon information that defines a superframe;
   determining from the beacon information whether one or more management time slots within an associated superframe are assigned to a network device or are unassigned;
   repeating the steps of receiving and determining until the remote device either receives M beacons indicating that the one or more management time slots within the associated superframe are assigned, or a beacon indicating that the one or more management time slots within the associated superframe are unassigned;
   performing an association request if the remote device receives the beacon indicating that the one or more management time slots within the associated superframe are unassigned;
   performing a network-full function if the remote device receives the M beacons indicating that the one or more management time slots within the associated superframe are assigned,
   wherein M is an integer greater than one.

2. A method for a remote device to monitor and communicate with a wireless network, as recited in claim 1, wherein the beacon information comprises a single bit indicative of whether the one or more management time slots within the associated superframe are assigned or unassigned.

3. A method for a remote device to monitor and communicate with a wireless network, as recited in claim 1, wherein the beacon information includes device identification (ID) information.

4. A method for a remote device to monitor and communicate with a wireless network, as recited in claim 3,
   wherein the device ID information is a device ID of an associated network device if the one or more management time slots within the associated superframe are assigned, and
   wherein the device ID is a set unassigned value that does not correspond to any network device but is indicative that the one or more management time slots within the associated superframe are unassigned.

5. A method for a remote device to monitor and communicate with a wireless network, as recited in claim 1, wherein the network-full function includes sending an error message to a higher layer.

6. A method for a remote device to monitor and communicate with a wireless network, comprising:
   receiving a beacon at the remote device, the beacon including beacon information that defines a superframe;
   determining from the beacon information whether a plurality of management time slots within an associated superframe are fully assigned to N network devices or whether the plurality of management time slots in the associated superframe are assigned to fewer than N devices;
   repeating the steps of receiving and determining until the remote device either receives M beacons indicating that a corresponding plurality of management time slots in the associated superframes are fully assigned to N network devices or one beacon indicating that the corresponding plurality of management time slots in the associated superframe are assigned to fewer that N network devices;
   performing an association request if the remote device receives a beacon indicating that the corresponding plurality of management time slots in the associated superframe are assigned to fewer that N network devices;
   performing a network-full function if the remote device receives M beacons indicating that a corresponding plurality of management time slots in the associated superframes are fully assigned to N network devices,
   wherein M is an integer greater than one, and
   wherein N is an integer greater than one.

7. A method for a remote device to monitor and communicate with a wireless network, as recited in claim 6, wherein the value of N can vary for each superframe.

8. A method for a remote device to monitor and communicate with a wireless network, as recited in claim 6, wherein the beacon information includes first through $N^{th}$ device identification (ID) information.

9. A method for a remote device to monitor and communicate with a wireless network, as recited in claim 8,
wherein each of the first through $N^{th}$ device ID information is one of: a device ID of an associated network device, and a set unassigned value that does not correspond to any network device but is indicative of one or more unassigned management time slots, and
wherein the plurality of management time slots in the associated superframe are considered to be fully assigned if all of the first through $N^{th}$ device information are device IDs, and the plurality of management time slots in the associated superframe are considered to be assigned to fewer that N network devices if any of the first through $N^{th}$ device information are the set unassigned value.

10. A method for a remote device to monitor and communicate with a wireless network, as recited in claim 6, wherein the network-full function includes sending an error message to a higher layer.

11. A method for a coordinator to communicate information in a wireless network that employs a superframe structure, comprising:
generating M beacons, each including beacon information that defines one of M respective superframes; and
sequentially transmitting the M beacons, respectively, during the M respective superframes,
wherein the beacon information includes data indicative of whether management time slots within the respective superframe are assigned to a device in the network or are unassigned, and
wherein M is an integer greater than one.

12. A method for a coordinator to communicate information in a wireless network that employs a superframe structure, as recited in claim 11, wherein the steps of generating M beacons and sequentially transmitting the M beacons are continually repeated throughout operation of the network.

13. A method for a coordinator to communicate information in a wireless network that employs a superframe structure, as recited in claim 11, wherein M is equal to the maximum number of devices allowable in the network.

14. A method for a coordinator to communicate information in a wireless network that employs a superframe structure, as recited in claim 11, wherein M is equal to the number of assigned devices in the network plus a set value.

15. A method for a coordinator to communicate information in a wireless network that employs a superframe structure, as recited in claim 14, wherein the set value is one.

16. A method for a coordinator to communicate information in a wireless network that employs a superframe structure, comprising:
generating M beacons, each including beacon information that defines one of M respective superframes; and
sequentially transmitting the M beacons, respectively, during the M respective superframes,
wherein the beacon information includes data indicative of whether a plurality of management time slots within the respective superframe are fully assigned to N devices in the network or whether the plurality of management time slots in the superframe are assigned to fewer than N devices,
wherein M is an integer greater than one, and
wherein N is an integer greater than one.

17. A method for a coordinator to communicate information in a wireless network that employs a superframe structure, as recited in claim 16, wherein the steps of generating M beacons and sequentially transmitting the M beacons are continually repeated throughout operation of the network.

18. A method for a coordinator to communicate information in a wireless network that employs a superframe structure, as recited in claim 16, wherein (M×N) is equal to the maximum number of devices allowable in the network.

* * * * *